United States Patent
Roberts et al.

(10) Patent No.: US 12,067,463 B2
(45) Date of Patent: Aug. 20, 2024

(54) MACHINE LEARNING PLATFORM

(71) Applicant: Mind Foundry Ltd, Oxford (GB)

(72) Inventors: Stephen Roberts, Abingdon (GB); Mike Osborne, Oxford (GB); Brian Mullins, Oxford (GB); Paul Reader, Oxford (GB); Nathan Korda, Oxford (GB); Rob Williams, Thatcham (GB); Stanley Speel, Oxford (GB)

(73) Assignee: Mind Foundry Ltd, Oxford (GB)

( * ) Notice: Subject to any disclaimer, the term of this patent is extended or adjusted under 35 U.S.C. 154(b) by 707 days.

(21) Appl. No.: 16/793,814

(22) Filed: Feb. 18, 2020

(65) Prior Publication Data

US 2021/0256310 A1  Aug. 19, 2021

(51) Int. Cl.
*G06N 20/00* (2019.01)
*G06F 18/214* (2023.01)

(52) U.S. Cl.
CPC ......... *G06N 20/00* (2019.01); *G06F 18/2148* (2023.01)

(58) Field of Classification Search
CPC .............................. G06N 20/00; G06K 9/6257
See application file for complete search history.

(56) References Cited

U.S. PATENT DOCUMENTS

| | | | | |
|---|---|---|---|---|
| 11,954,610 B2 * | 4/2024 | Hong | ....................... | G06N 5/04 |
| 2016/0132787 A1 * | 5/2016 | Drevo | .................... | G06N 20/10 706/12 |
| 2016/0371601 A1 * | 12/2016 | Grove | .................... | G06N 20/00 |
| 2018/0336484 A1 * | 11/2018 | Hunt | ........................ | G06N 7/01 |
| 2019/0362222 A1 * | 11/2019 | Chen | .................... | G06N 3/0481 |
| 2020/0089650 A1 * | 3/2020 | Sharma | ................ | G06K 9/6256 |
| 2020/0202436 A1 * | 6/2020 | Krishnan | ........... | G06N 5/003 |
| 2020/0210417 A1 * | 7/2020 | Murray | ............... | G06F 16/2456 |
| 2020/0311911 A1 * | 10/2020 | Poole | .................... | G16H 50/20 |
| 2020/0349464 A1 * | 11/2020 | Lin | ........................ | G06V 10/82 |
| 2020/0410390 A1 * | 12/2020 | Fu | ....................... | G06F 11/3466 |
| 2021/0019665 A1 * | 1/2021 | Gur | ........................... | G06F 8/36 |
| 2021/0049428 A1 * | 2/2021 | Huang | .................. | G06F 18/251 |
| 2021/0073627 A1 * | 3/2021 | Sarferaz | ................. | G06N 20/00 |

(Continued)

FOREIGN PATENT DOCUMENTS

| | | | | |
|---|---|---|---|---|
| JP | 2023514465 | | 4/2023 | |
| WO | WO-2020028440 A1 * | | 2/2020 | ............. G06F 17/18 |
| WO | 2021165746 | | 8/2021 | |

OTHER PUBLICATIONS

"International Application Serial No. PCT/IB2021/000097, International Search Report mailed Jun. 18, 2021", 4 pgs.

(Continued)

*Primary Examiner* — Hee Soo Kim
(74) *Attorney, Agent, or Firm* — Schwegman Lundberg & Woessner, P.A.

(57) ABSTRACT

A machine learning platform operating at a server is described. The machine learning platform accesses a dataset from a datastore. A task that identifies a target of a machine learning algorithm from the machine learning platform is defined. The machine learning algorithm forms a machine learning model based on the dataset and the task. The machine learning platform deploys the machine learning model and monitors a performance of the machine learning model after deployment. The machine learning platform updates the machine learning model based on the monitoring.

22 Claims, 18 Drawing Sheets

(56) References Cited

U.S. PATENT DOCUMENTS

2023/0048301 A1* 2/2023 Kotolyan .............. G06F 3/0482
2023/0177397 A1* 6/2023 Huang .................. G06N 20/00
                                                      706/12

OTHER PUBLICATIONS

"International Application Serial No. PCT/IB2021/000097, Written Opinion mailed Jun. 18, 2021", 11 pgs.

Favour, M Nyikosa, "Adaptive Configuration Oracle for Online Portfolio Selection Methods", arxiv.org, Cornell University Library, 201 Olin Library Cornell University Ithaca, NY 14853, (Aug. 22, 2019), 2-6.

Li, Bin, "OLPS: A Toolbox for On-Line Portfolio Selection", Journal of Machine Learning Research, (Jan. 1, 2016), 1-5.

Pengqian, Yu, "Model-based Deep Reinforcement Learning for Dynamic Portfolio Optimization", arxiv.org, Cornell University Library, 201 Olin Library Cornell University Ithaca, NY 14853, (Jan. 25, 2019), 22 pgs.

"International Application Serial No. PCT IB2021 000097, International Preliminary Report on Patentability mailed Sep. 1, 2022", 13 pgs.

"European Application Serial No. 20892308.6, Response to Communication pursuant to Rules 161(2) and 162 EPC filed Jan. 27, 2023", 36 pgs.

* cited by examiner

MACHINE LEARNING PLATFORM

TECHNICAL FIELD

The subject matter disclosed herein generally relates to methods, systems, and programs for a machine learning platform. Specifically, the present disclosure addresses systems, methods, and computer programs for generating and optimizing a machine learning model.

BACKGROUND

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data. However, such a model may not address the demands of a user application because it may not be relevant to a problem that the user is attempting to solve with the user application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
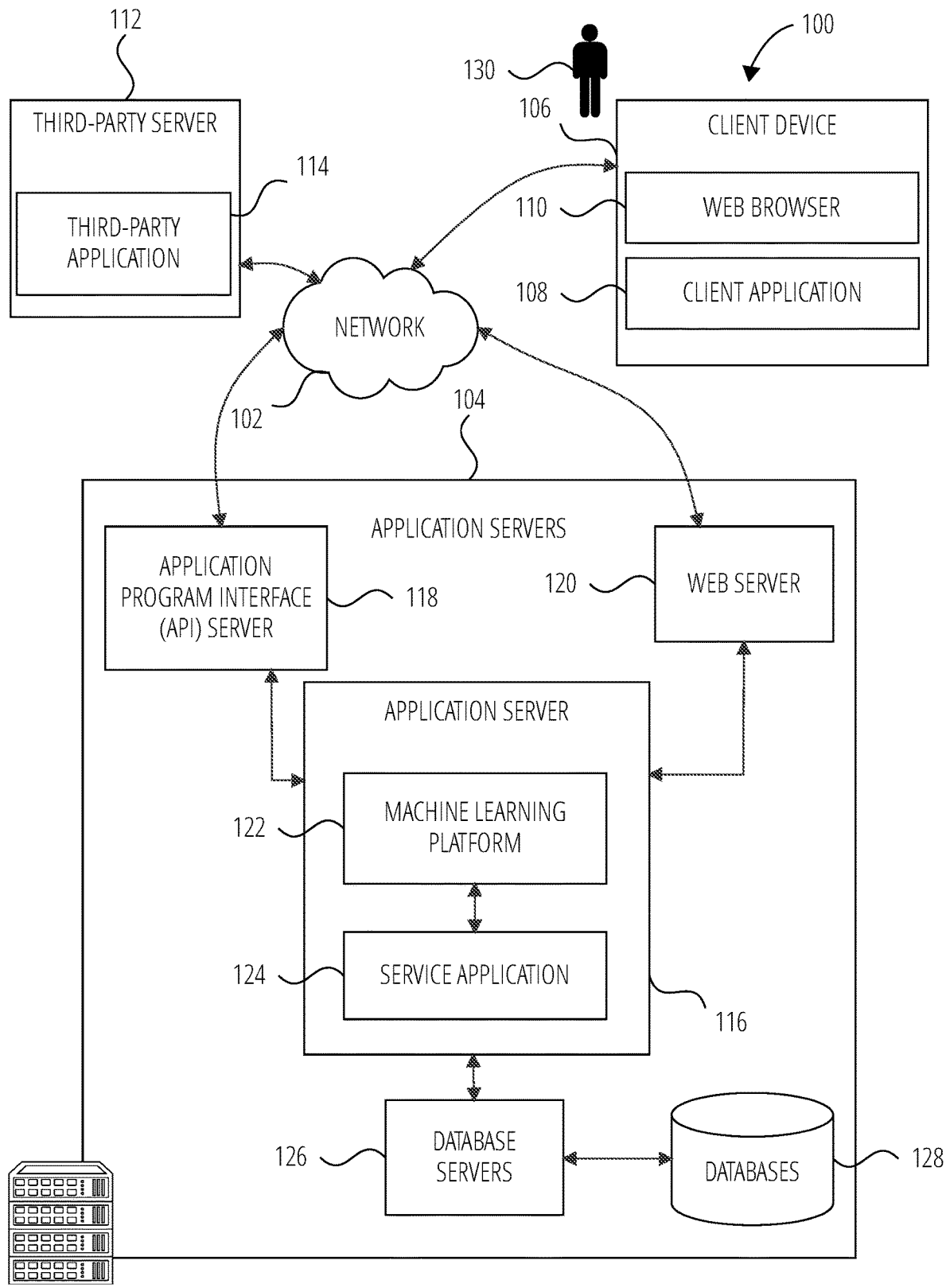
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a machine learning platform that generates machine learning models based on a user-defined task (e.g., a problem to be solved, features exploration) and training data that is prepared (e.g., estimating missing data, filtering inaccurate or outlier data) and/or augmented with additional data from an external dataset source (e.g., additional data from a user of the machine learning platform, additional data from a marketplace library of dataset). The machine learning platform deploys the machine learning model for access by an application that is external to the machine learning platform. The machine learning platform monitors the performance (also referred to as health) of the deployed machine learning model and determines a suitability of the currently deployed machine learning model for the user-defined task. The machine learning platform adjusts the training data and/or the task definition based on the performance/health of the currently deployed machine learning model.

In one example embodiment, a user of the machine learning platform uploads data to a data ingestion system of the machine learning platform. The uploaded data is augmented with additional data from a library of datasets or additional data from the user. A task system of the machine learning platform defines a task that specifies a problem to be solved (e.g., target column, data exploration). The machine learning platform analyzes the data for deficit or inconsistencies and provides a suggestion to better prepare the data for processing by a machine learning algorithm. For example, the machine learning platform's suggestion may encompass a particular section of the data for processing. This suggestion can influence an algorithm's approach to learning on the given data, based on the partitioned data provided and its properties (e.g., the boundary values of the partitioned data or the existence of missing data). The machine learning platform builds a machine learning model based on the prepared data and assesses its performance. Once the machine learning platform determines that the performance of the machine learning model is acceptable, the machine learning platform deploys the machine learning model by exporting the machine learning model to a deployment engine. In one example, an application external to the machine learning platform accesses the machine learning model. The machine learning platform monitors a usage and performance of the machine learning model. In one example, the machine learning platform determines that the performance of the machine learning model is no longer acceptable because the machine learning model no longer accurately resolves the task. In such a situation, the machine learning platform recommends that the task be redefined. In another example, for the same task, the machine learning platform suggests a different data partition and a different machine learning model search space as part of the data preparation. In another example, the machine learning platform includes a guidance or advice functionality that solicits from the user additional clarification information to clarify the uploaded data and provide context to the uploaded data.

In another example embodiment, the machine learning platform provides a system for performing time series forecasting of a value of an item (e.g., stock, commodity). Specifically, the machine learning platform includes an automatic parameter update for online forecasting model of a value of an item. For example, the machine learning platform uses historical data of the value of the item to generate a machine learning model. New data may have new statistical properties that are incompatible with the statistical properties of the historical data. In such a situation, the machine learning model becomes unsuitable for accurate forecasting. To overcome this situation, the system automatically updates the algorithm parameters based on available new data. In a further embodiment, the machine learning platform includes a back testing feature to evaluate an accuracy of a prediction of the value of an item based on a machine learning model.

In another example embodiment, a machine learning platform operating at a server is described. The machine learning platform accesses a dataset from a datastore. A task that identifies a target of a machine learning algorithm from the machine learning platform is defined. The machine learning algorithm forms a machine learning model based on the dataset and the task. The machine learning platform deploys the machine learning model and monitors a performance of the machine learning model after deployment. The machine learning platform may update the machine learning model based on the monitoring.

As a result, one or more of the methodologies described herein facilitate solving the technical problem of outdated or inaccurate machine learning models. As such, one or more of the methodologies described herein may obviate a need for certain efforts or computing resources that otherwise would be involved in using outdated machine learning models. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A web browser 110 (e.g., a browser) and a client application 108 (e.g., an "app") are hosted and execute on the web browser 110. A user 130 operates client device 106.

An Application Program Interface (API) server 118 and a web server 120 provide respective programmatic and web interfaces to application servers 104. A specific application server 116 hosts a machine learning platform 122 (which includes components, modules and/or applications) and a service application 124. The machine learning platform 122 receives training data from the client device 106, the third-party server 112, or the service application 124. The machine learning platform 122 generates a machine learning model based on the training data. The machine learning platform 122 deploys the machine learning model and monitors a performance (e.g., accuracy) of the machine learning model.

In some example embodiments, the machine learning platform 122 includes machine-learning programs (MLPs), also referred to as machine-learning algorithms or tools, that are utilized to perform operations associated with predicting a value of an item at a future point in time, solving values of a target column, or discovering features of training data.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a machine learning model from training data in order to make data-driven predictions or decisions expressed as outputs. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying attributes of the training data or identifying patterns in the training data.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, machine learning algorithms identify patterns of significance in relation to other attributes in the training data. These algorithms utilize this training data to model such similar relations that might affect a predictive outcome.

The service application 124 includes a programmatic application accessed by the client device 106. Example of programmatic applications include document authoring applications, communication applications, process applications, and analysis applications. The service application 124 is external to the machine learning platform 122. The service application 124 accesses the machine learning model generated at the machine learning platform 122 and performs operations based on the machine learning model.

The web browser 110 communicates with the machine learning platform 122 via the web interface supported by the web server 120. Similarly, the client application 108 communicates with the machine learning platform 122 via the programmatic interface provided by the Application Program Interface (API) server 118. In another example, the client application 108 communicates with the service application 124 via the Application Program Interface (API) server 118.

The application server 116 is shown to be communicatively coupled to database servers 126 that facilitates access to an information storage repository or databases 128. In an example embodiment, the databases 128 includes storage devices that store information (e.g., dataset, augmented dataset, dataset marketplace, machine learning model library) to be published and/or processed by the machine learning platform 122.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may support one or more features or functions on a website hosted by the third party. For example, the third-party application 114 provides training data marketplace to the machine learning platform 122.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 16, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
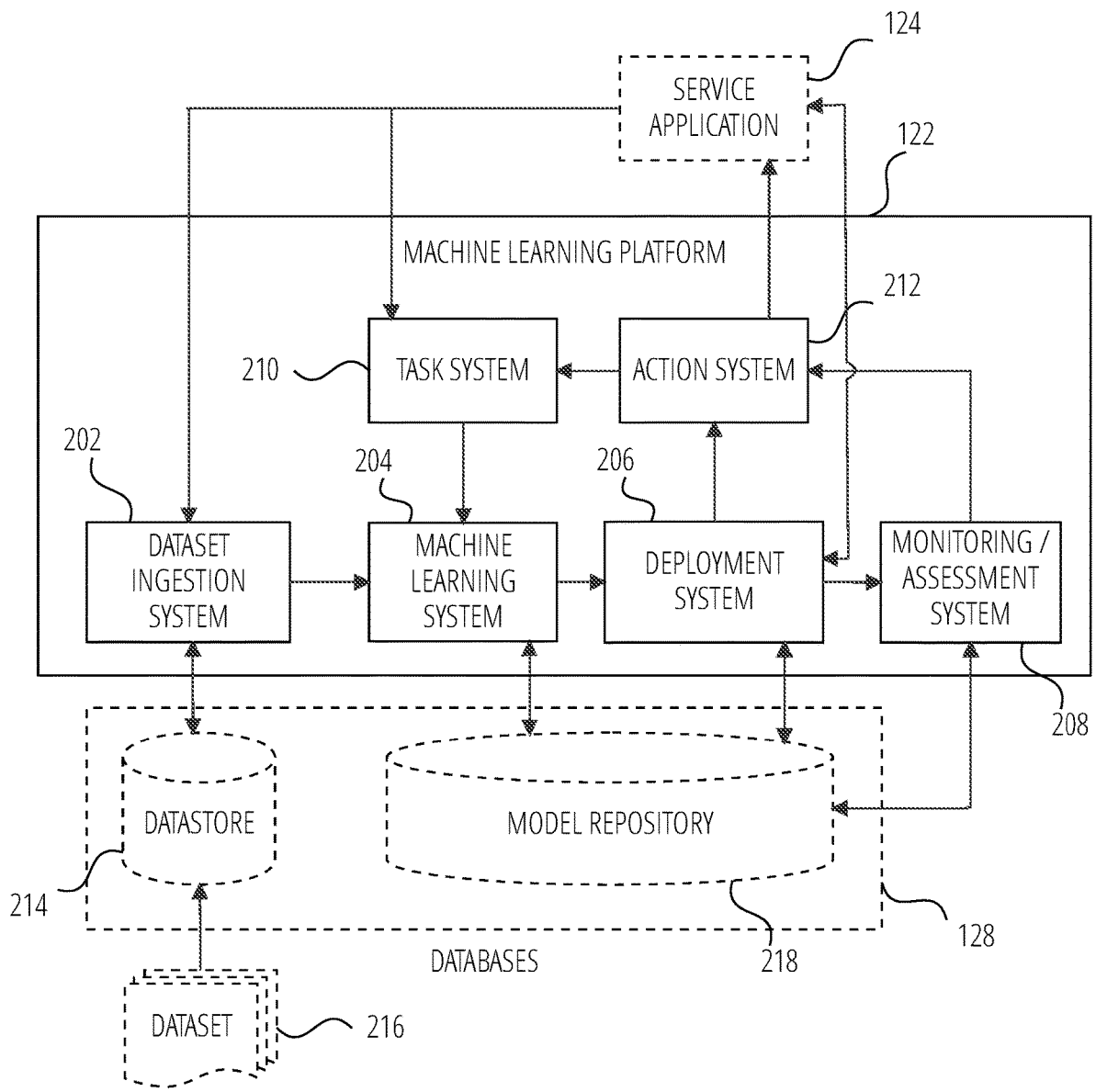
FIG. 2 illustrates a machine learning platform in accordance with one example embodiment.

FIG. 2 illustrates a machine learning platform 122 in accordance with one example embodiment. The machine learning platform 122 includes a dataset ingestion system 202, a machine learning system 204, a deployment system 206, a monitoring/assessment system 208, a task system 210, an action system 212.

The dataset ingestion system 202 acquires training data for the machine learning system 204 from a datastore 214 at the databases 128. The datastore 214 includes a dataset provided by the client device 106, the service application 124, or the third-party application 114. In one example embodiment, the dataset ingestion system 202 annotates the training data with statistical properties (e.g., mean, variance, n-ordered differences) and tags (e.g., parts of speech for words in the text data, days of week for date-time values, anomaly flagging for continuous data). In another example embodiment, the dataset ingestion system 202 analyzes the training data and determines whether additional training data (relevant or complimentary to the training data) are available to further augment the training data. In one example, the dataset ingestion system 202 requests the client device 106 to provide additional data. In another example, the dataset ingestion system 202 accesses a library of datasets in the datastore 214 and augments the training data with at least one of the dataset from the library of datasets. In yet another example, the dataset ingestion system 202 accesses a marketplace of datasets (e.g., provided by the third-party application 114) to identify a dataset to augment the training data. For example, a data set includes a column of zip codes. The dataset ingestion system 202 identifies the data as zip codes and offers to augment the data set by adding another dataset such as "mean income" for each zip code from a library of other datasets (e.g., latitude, longitude, elevation, weather factors, social factor).

In another example embodiment, the dataset ingestion system 202 includes an advisor feature that advises the client device 106 (that provides the dataset 216) on how to prepare the dataset 216 for processing by the machine learning system 204. For example, the dataset ingestion system 202 analyzes a structure of the dataset 216 and advises the client device 106 that the dataset contains missing values that should be amended before processing by the machine learning system 204. In one example, the dataset ingestion system 202 estimates the missing values based on approximation.

The task system 210 defines a task for the machine learning system 204. For example, the task identifies parameters of a goal (e.g., problem to be solved, target column, data validation and testing method, scoring metric). The task system 210 receives a definition of the task from the client device 106, the service application 124, or the third-party application 114. In another example, the task system 210 receives an updated task from the action system 212. The task system 210 can also define non-machine learning tasks, such as data transformations and analysis.

The machine learning system 204 uses a machine learning algorithm to train a machine learning model based on the data from the dataset ingestion system 202 and the task from the task system 210. In one example, the machine learning system 204 forms and optimizes a machine learning model to solve the task defined in the task system 210. Example embodiments of the machine learning system 204 are described further below with respect to FIG. 3.

The deployment system 206 includes a deployment engine (not shown) that deploys the machine learning model to other applications (that are external to the machine learning platform 122). For example, the deployment system 206 provisions an infrastructure such that the machine learning model may exist in a query-able setting and be used to make predictions upon request. An example of a deployment includes uploading of the machine learning model or parameters to replicate such a model to the deployment system 206, such that the deployment system 206 may then support the machine learning model and expose the relevant functionalities.

In another example, the deployment system 206 enables the service application 124 to access and use the machine learning model to generate forecasts and predictions on new data. The deployment system 206 stores the model in a model repository 218 of the databases 128.

The monitoring/assessment system 208 tests and assesses a performance of the machine learning model (from the deployment system 206). For example, the monitoring/assessment system 208 runs tests and benchmarks on a model to assess its algorithmic and computational performance and facilitate comparison with other models. In another example, the monitoring/assessment system 208 may receive validation of the quality or performance from a user of the client device 106. In yet another example, the monitoring/assessment system 208 includes tracking model usage, monitoring performance, and allowing the model to make predictions and take actions based on arbitrary triggers rather than simply API calls from other services.

In another example, the deployment system 206 enables the service application 124 to access and use the machine learning model to generate forecasts and predictions on new data. In another example, the deployment system 206 stores the model in a model repository 218 of the databases 128.

The action system 212 triggers an external action (e.g., a call to the service application 124) based predefined conditions. For example, the action system 212 detects that the deployment system 206 has deployed the machine learning model. In response to detecting the deployment of the machine learning model, the action system 212 notifies the service application 124 (e.g., by generating and communicating an alert of the deployment to the service application 124). Other examples of actions from the action system 212 include retraining of the machine learning model, updating of model parameters, stopping the model functioning if performance is below a threshold (failsafe feature), communicating (via email/text/messaging platform) alerts based on performance or usage.

The monitoring/assessment system 208 monitors the deployment of the machine learning model. For example, the monitoring/assessment system 208 continuously monitors a performance of the machine learning model (used by the service application 124) and provides a feedback to the dataset ingestion system 202 and the task system 210 via the action system 212. For example, the service application 124 provides an updated task to the task system 210 and latest data to the dataset ingestion system 202. This process may be referred to as meta learning. In another example, the monitoring/assessment system 208 may also monitor characteristics of the data such as frequency of missing values or outliers, and employ different strategies to remedy these issues. The monitoring/assessment system 208 thus refines which strategies to use for a given situation by learning which strategy is most effective.

In one example embodiment, the monitoring/assessment system 208 monitors a performance of the machine learning model. For example, the monitoring/assessment system 208 intermittently assesses the performance of the machine learning model as new data comes in, such that an updated score can be derived representing the model's most recent performance. In another example, the monitoring/assessment system 208 quantifies and monitors the sensitivity of the machine learning model to noise by perturbing the data and assessing the impact on model scores/predictions. After updating a machine learning model, the monitoring/assessment system 208 may also test the machine learning model on a set of holdout data to ensure it is appropriate for deployment (e.g., by comparing the performance of a new model to the performance of previous models). Model performance can also be quantified in terms of compute time and required resources such that if the frequency or type of data being ingested changes causing a drop in efficiency or speed, the user may be alerted to this.

The monitoring/assessment system 208 determines whether the performance/accuracy of the machine learning model is acceptable (e.g., above a threshold score). If the monitoring/assessment system 208 determines that the performance/accuracy of the machine learning model is no longer acceptable, the action system 212 redefines the task at the task system 210 or suggests changes to the training data at dataset ingestion system 202. For example, if performance is no longer acceptable, the action system 212 raises an alert to the user 130 through communication means (e.g., email/text), and provide suggestions of the cause of the problem and remedial steps. The action system 212 can also update the model based on the latest data or stop the model from making predictions. In another example embodiment, these action behaviors may be defined by the user in an "if this then that" fashion.

Figure 3:
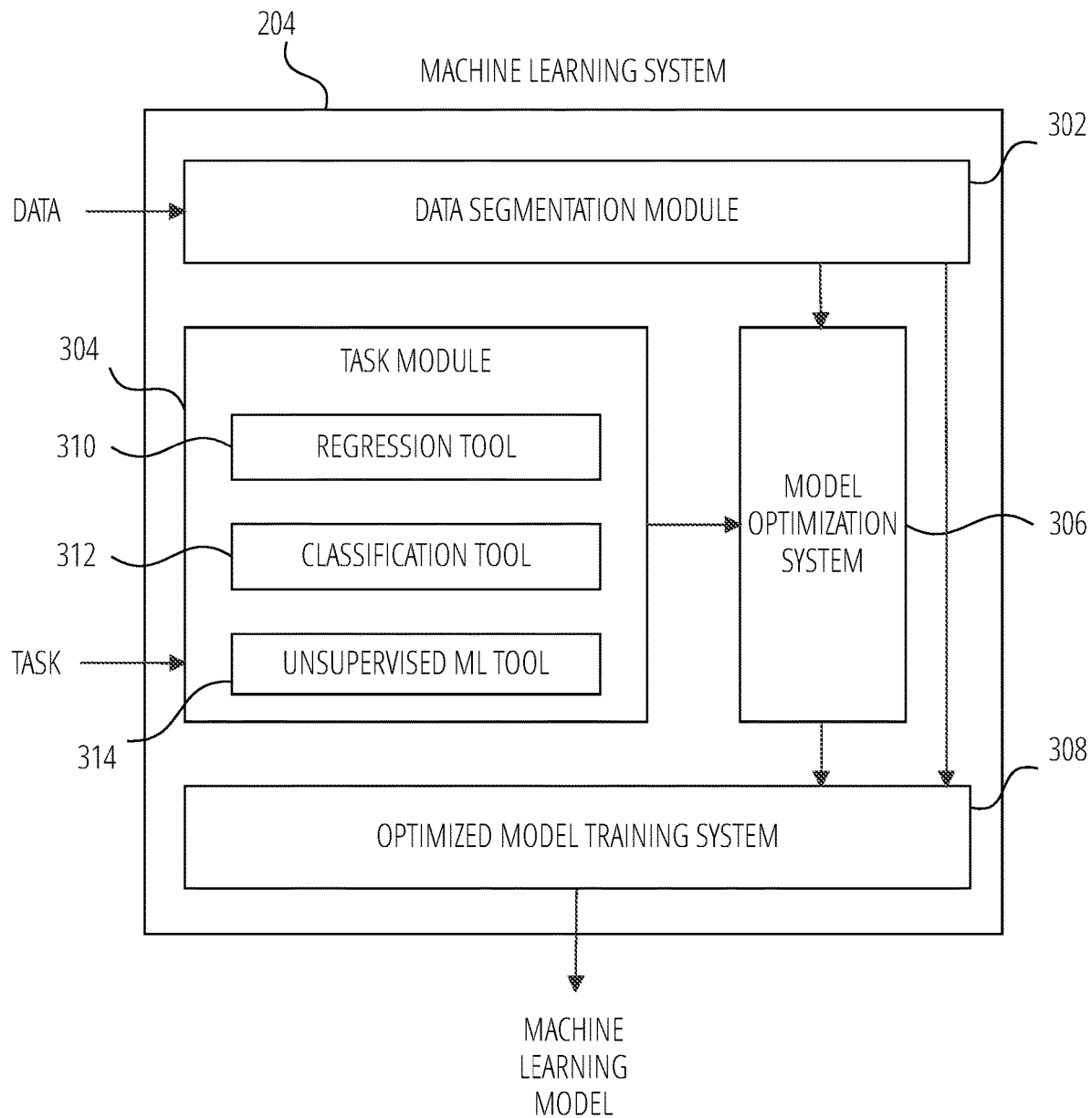
FIG. 3 illustrates a machine learning system in accordance with one example embodiment.

FIG. 3 illustrates a machine learning system 204 in accordance with another example embodiment. The machine learning system 204 includes a data segmentation module 302, a task module 304, a model optimization system 306, and an optimized model training system. The machine learning system 204 receives training data via the dataset ingestion system 202. The dataset ingestion system 202 provides data to the data segmentation module 302. The data segmentation module 302 summarizes the data. For example, data is summarized by calculating summary statistics and describing the sample's distribution. Continuous values are binned and counted. Outliers and anomalies are flagged. The data segmentation module 302 further slices the summarized data into data slices such that a mathematical definition of information contained in the original data is equally distributed between the data slices. This is achieved by stratification of data partitions; ensuring that the data distributions between slices are as closely matched as possible. The data segmentation module 302 provides the data slices to the model optimization system 306.

The task system 210 provides the user-defined task to task module 304. The task module 304 includes different types of machine learning tools: a regression tool 310, a classification tool 312, and an unsupervised ML tool 314. The task system 210 maps the user-defined task to the one of the machine learning tools. For example, if the user-defined task has a goal of predicting a categorical value, the task system 210 would map the task to a classification tool. A goal of predicting a continuous value would be mapped to a regression tool. If the user-defined task is to find underlying groupings within the data, it would be mapped to a clustering (unsupervised ML) tool. In one example, a look up table is defined and provides a mapping between different types of task and a type of machine learning tool.

The model optimization system 306 trains a machine learning model based on the data slices and the type of machine learning tool. An example embodiment of the model optimization system 306 is described further below with respect to FIG. 4.

The optimized model training system 308 receives the optimized machine learning model from the model optimization system 306, retrains the model with all available and appropriate data, and provides the trained optimized machine learning model to the deployment system 206.

Figure 4:
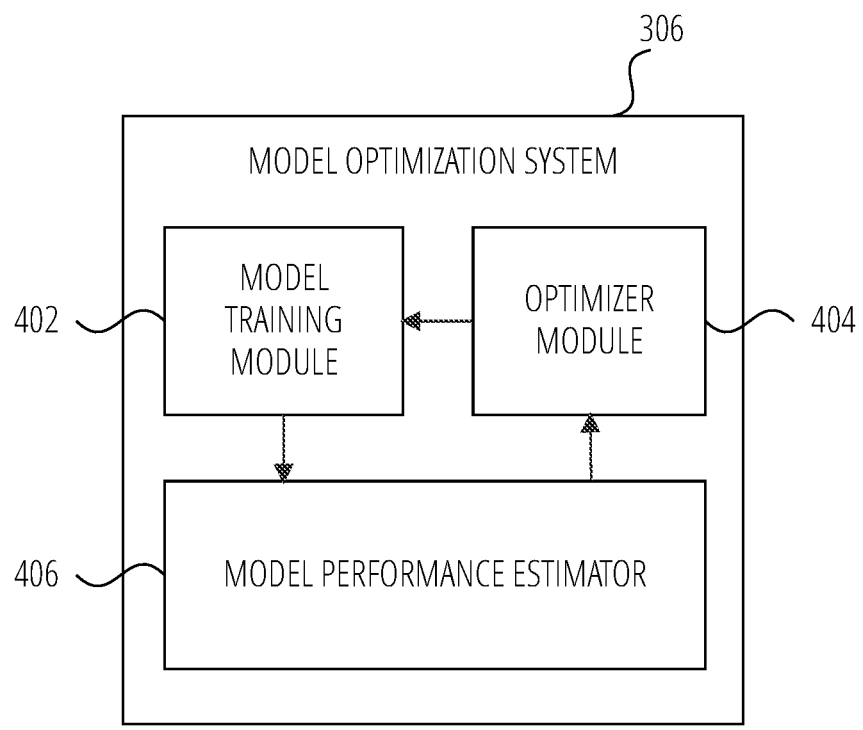
FIG. 4 illustrates a model optimization system in accordance with one example embodiment.

FIG. 4 illustrates a model optimization system in accordance with one example embodiment. The model optimization system 306 includes a model training module 402, an optimizer module 404, and a model performance estimator 406. The optimizer module 404 suggests a specific model. The specific model is defined through a set of hyperparameters. These are a collection of named values, which together fully specify a particular model ready for model fitting on some training data.

The model training module 402 trains the specific model using multiple data subsets. The model performance estimator 406 calculates a score representing the performance of the specific model. The optimizer module 404 receives the score and suggests another specific model based on the score. Given a model as, for example, a random forest, the model is trained using multiple data sets. The performance can be computed using, as an example, a loss function. If the score is below a threshold, the optimizer module 404 will navigate the space of hyper-parameters following, as an example, the gradients of the loss function. A new set of values for the model hyper-parameters will be suggested.

Figure 5:
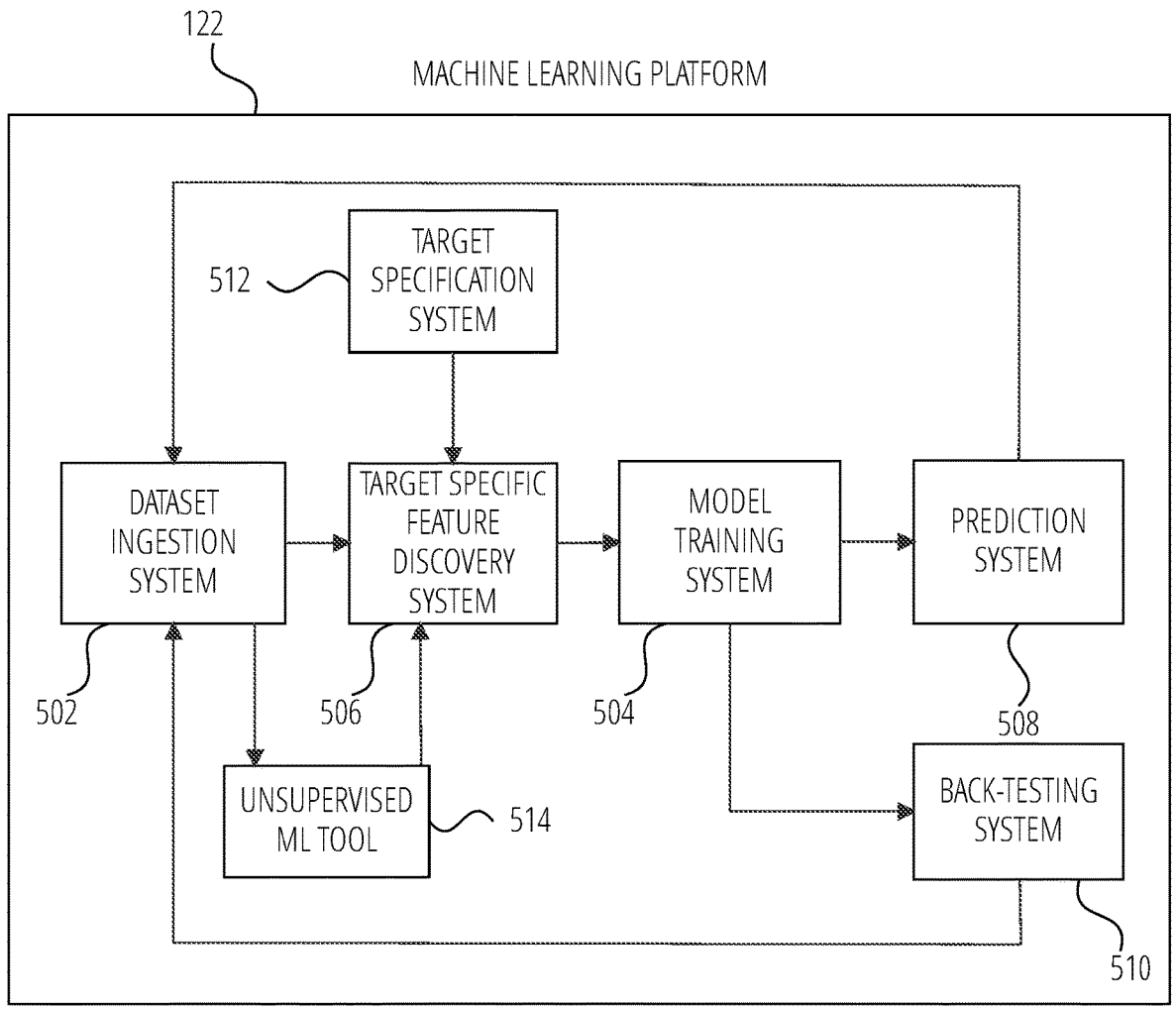
FIG. 5 illustrates a machine learning platform in accordance with another example embodiment.

FIG. 5 illustrates a machine learning platform in accordance with another example embodiment. The machine learning platform 122 performs a time series forecasting of a value of an item. The machine learning platform 122 includes a dataset ingestion system 502, a model training system 504, a target specific feature discovery system 506, a prediction system 508, a back-testing system 510, a target specification system 512, and an unsupervised ML tool 514.

The dataset ingestion system 502 receives data (e.g., time-varying signals) from a user of the client device 106. The user selects a signal (from the time-varying signals) that the user wishes to predict.

The target specification system 512 obtains, from the user or from the unsupervised ML tool 514, a target (e.g., desired points in the future to predict a value of an attribute in the data). The target includes a future value of a given time series, in reference to a present time point. The user uses the target specification system 512 to select specific future values in the signal that the user wishes to predict.

The target specific feature discovery system 506 discovers features of the data. A feature includes a derived signal property expressed temporally via a derived signal. An example embodiment of the target specific feature discovery system 506 is further described below with respect to FIG. 6.

The model training system 504 trains a machine learning model based on the features and the data. For example, a nonlinear regressor is trained on the historic time points (the features) of multiple time-varying signals.

The prediction system 508 uses the machine learning model to generate a prediction of the value of the attribute in the data at the desired points in the future. For example, the prediction system 508 uses a machine learning model to predict the value of the next time point in a given signal (e.g., what is the predicted revenue of store A next year, given yearly data of stores A-F).

The back-testing system 510 performs back tests on the data using the machine learning model to assess performance/accuracy of the machine learning model. The predictions output by the machine learning model are compared with the true values from that time-period, and the performance of the model is quantified.

Figure 6:
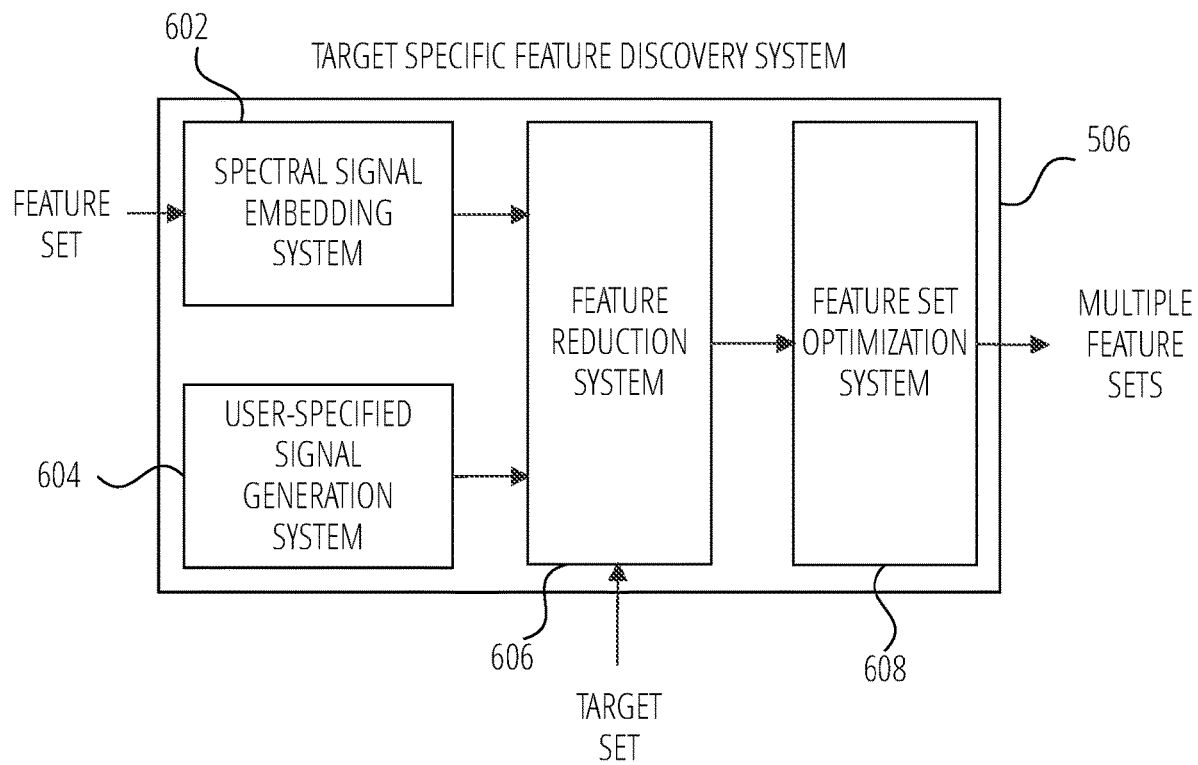
FIG. 6 illustrates a target specific feature discovery system in accordance with one example embodiment.

FIG. 6 illustrates a target specific feature discovery system 506 in accordance with one example embodiment. The target specific feature discovery system 506 includes a spectral signal embedding system 602, a user-specified signal generation system 604, a feature reduction system 606, and a feature set optimization system 608.

A feature set includes a collection of signals and signal transforms. A feature set is provided to the spectral signal embedding system 602. The spectral signal embedding system 602 encapsulates historical interdependencies of the signals via new features with simple short term relationships. For example, seasonal models (e.g., ETS Time Series models) are a single, and finite examples. This is often used in finance where signals are broken down into multiple components. Another example of historical interdependencies includes complex signals that demand more historical points and relationships to represent them. An example embodiment of the spectral signal embedding system 602 is described further below with respect to FIG. 7.

For each future target value in a user-defined target set, the feature reduction system 606 measures dependencies of the new features. A target set includes a collection of targets of a single time series. An example embodiment of the feature reduction system 606 is described further below with respect to FIG. 8.

The feature set optimization system 608 generates a single feature set for each target in the target set. It can be expected that feature sets that are useful for short term forecasts (e.g., next day) are very different than feature sets useful for long term forecasts (e.g., next year). The number of sales from a store yesterday is probably important for predicting the number of sales from a store tomorrow (perhaps much less important for several years down the line).

Figure 7:
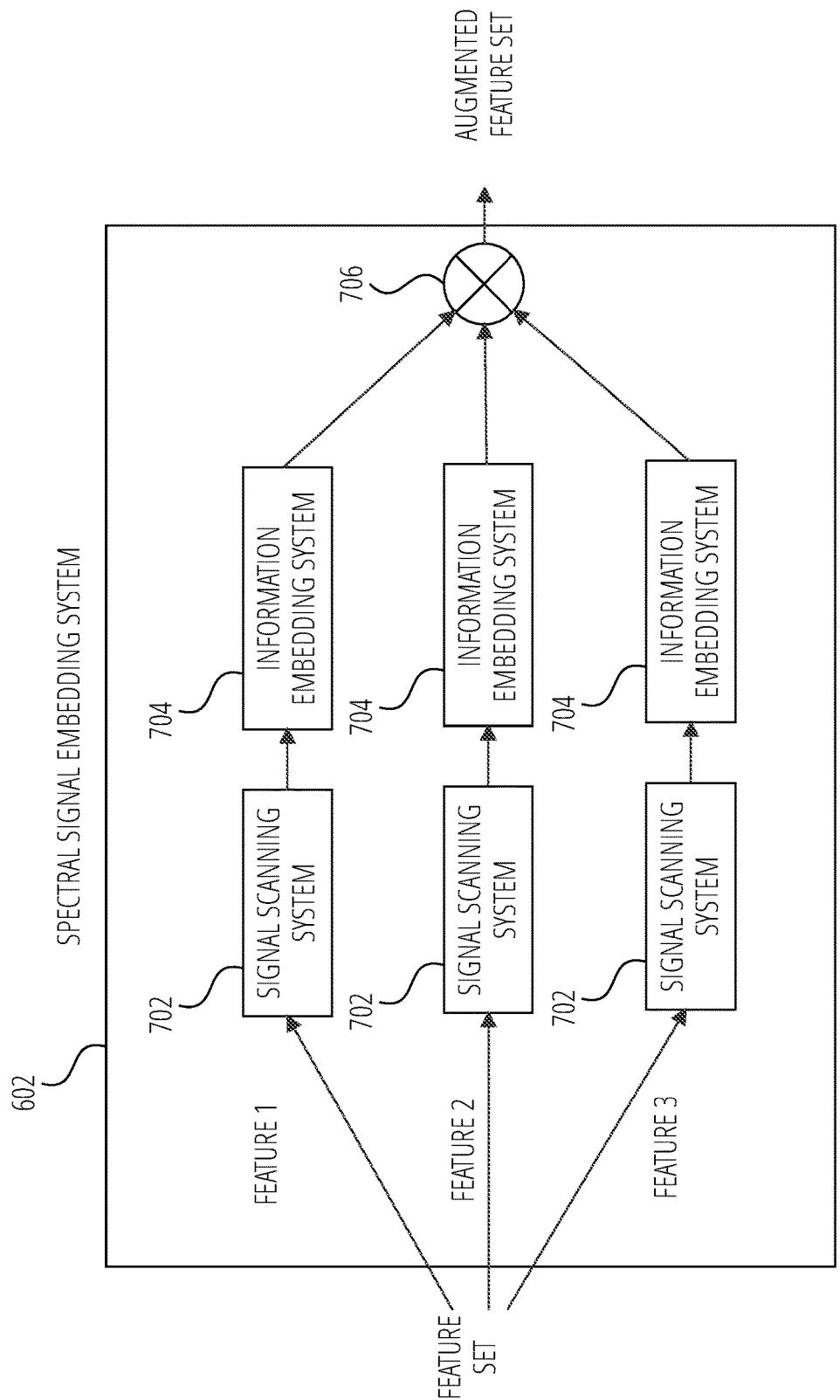
FIG. 7 illustrates a spectral signal embedding system in accordance with one example embodiment.

FIG. 7 illustrates a spectral signal embedding system 602 in accordance with one example embodiment. The spectral signal embedding system 602 includes a signal scanning system 702, an information embedding system 704, and a collector 706.

For each signal in the feature set, the signal scanning system 702 detects historic points of the signal that encode the information it contains. The information embedding system 704 shifts these points from the past to the present by generating multiple new signals. The collector 706 collects the new signals to form an augmented feature set. For example, consider two signals; one that is very simple (e.g., a sine wave), and one that is very complex. Information from both signals need to be included in a signal set. However, many more historic points are required from the complex signal than the sine wave to represent them. The collector 706 amalgamates all these points into one feature set.

Figure 8:
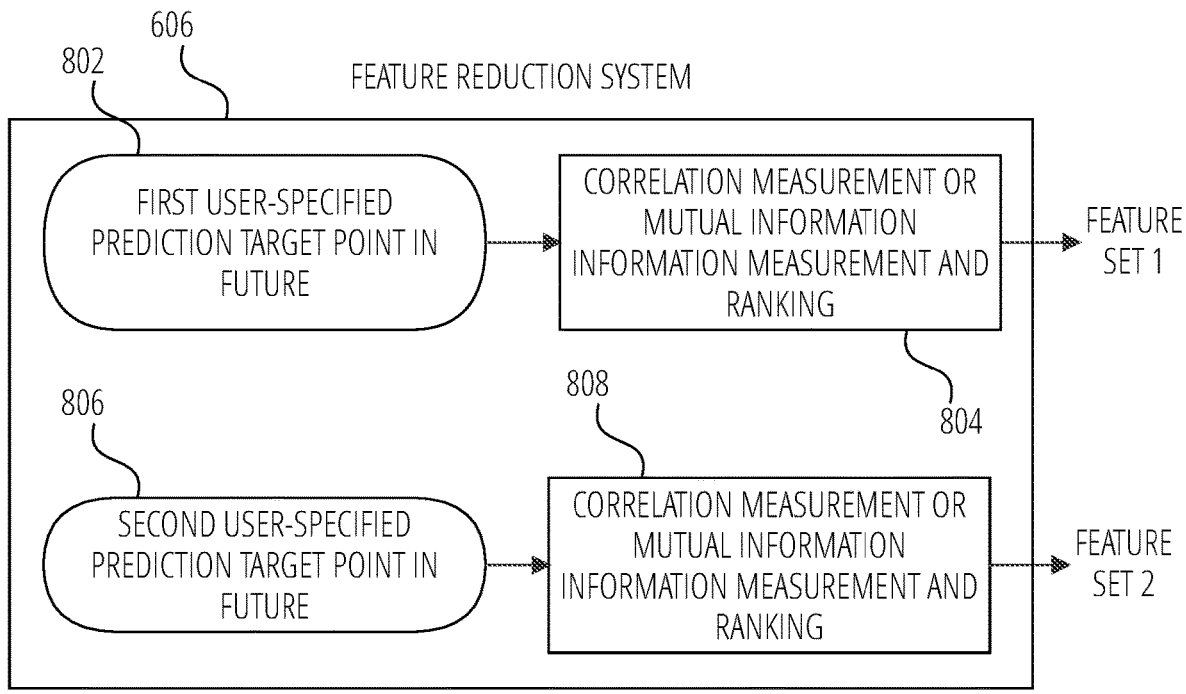
FIG. 8 illustrates a feature reduction system in accordance with one example embodiment.

FIG. 8 illustrates a feature reduction system 606 in accordance with one example embodiment. The feature reduction system 606 includes a first user-specified prediction target point in future 802, a correlation measurement or mutual information measurement and ranking 804, a second user-specified prediction target point in future 806, and a correlation measurement or mutual information measurement and ranking 808. For example, the target for forecasting is sales one day in the future. The training data can be shifted one day backwards, representing the future target, aligned with our input signals. The feature reduction system measures a linear or nonlinear relationship (e.g., mutual information) of the input signals with the shifted target signal, and cuts off signals that do not have a high relationship with the shifted target. This process is repeated for each target point in the future (e.g., sales one day in the future and one week in the future).

Figure 9:
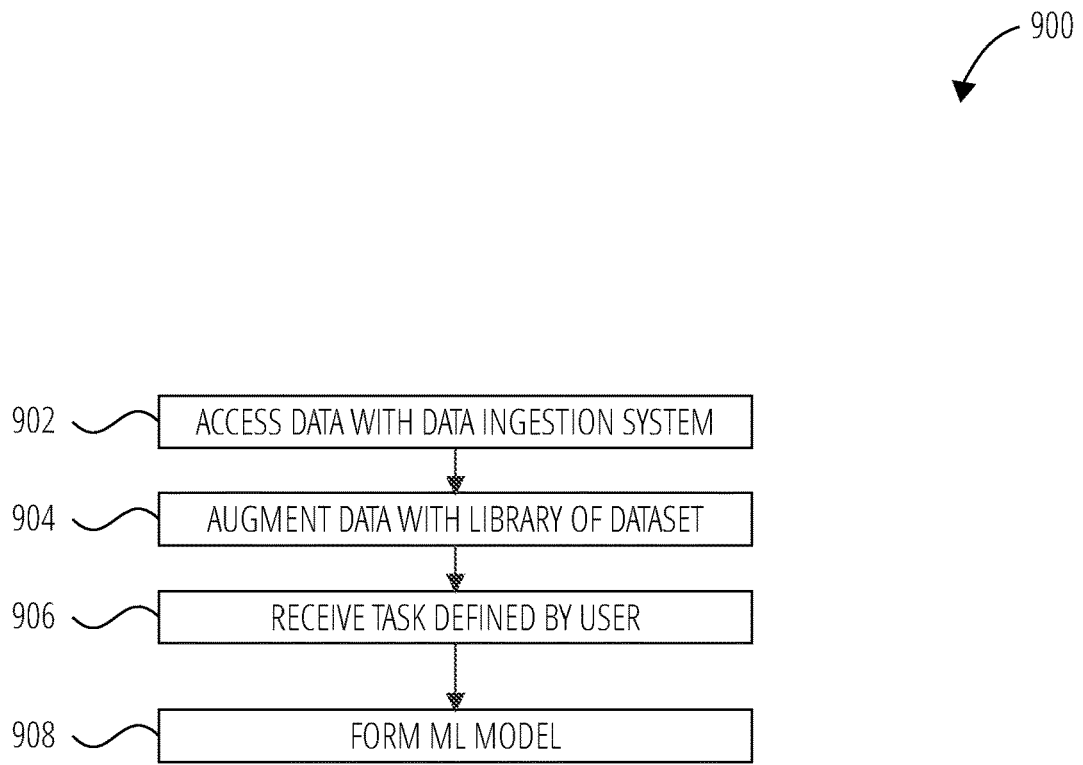
FIG. 9 illustrates a method for deploying a machine learning model in accordance with one example embodiment.

FIG. 9 illustrates a method for deploying a machine learning model in accordance with one example embodiment. The method 900 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 902, the dataset ingestion system 202 receives training data. At block 904, the dataset ingestion system 202 augments the training data with additional data from a library of dataset. At block 906, the task system 210 receives a task defined by a user of the machine learning platform 122. At block 908, the machine learning system 204 forms a machine learning model based on the training data and the task.

Figure 10:
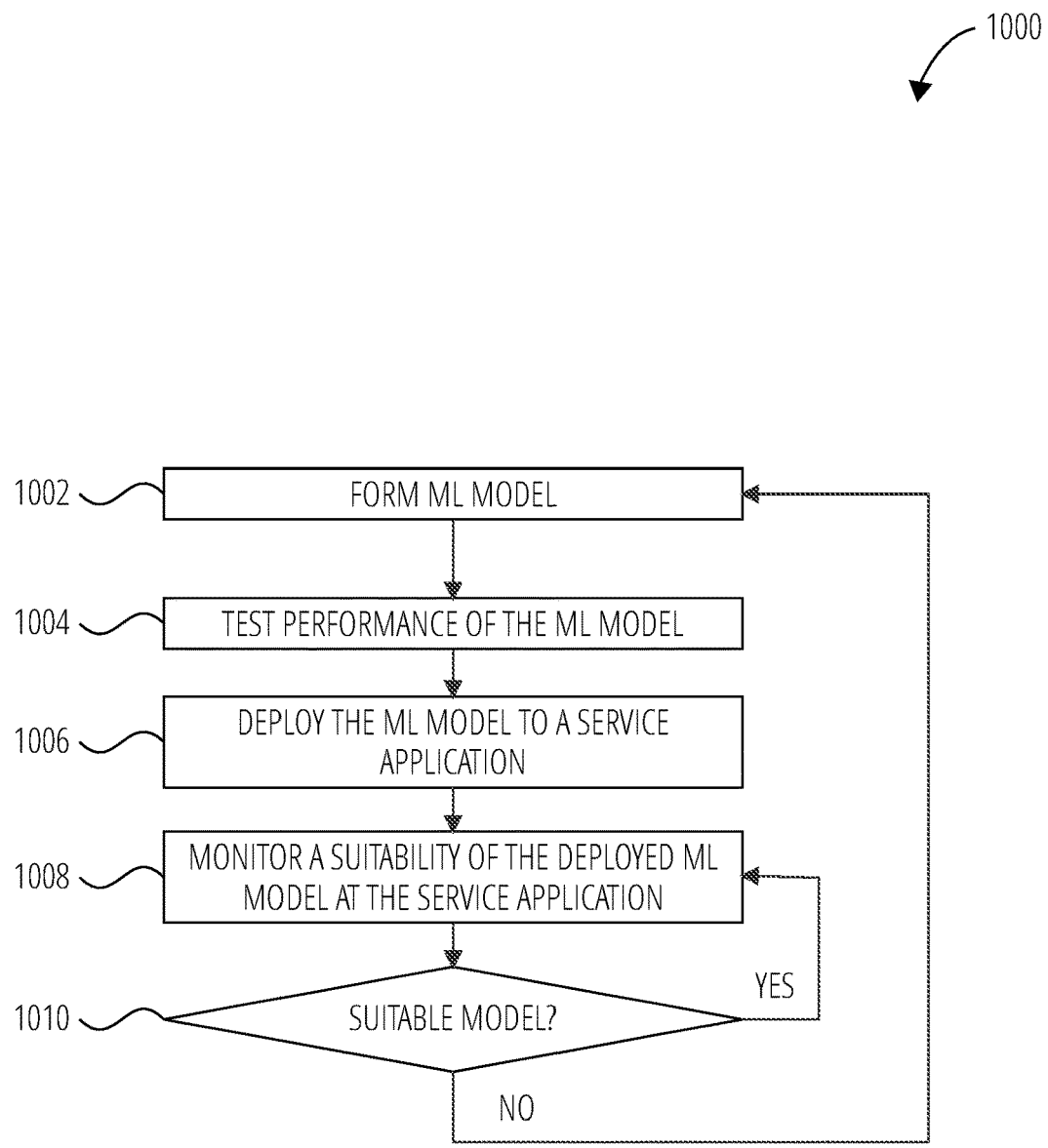
FIG. 10 illustrates a method for deploying a machine learning model in accordance with one example embodiment.

FIG. 10 illustrates a method for deploying a machine learning model in accordance with one example embodiment. The method 1000 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 1002, the machine learning system 204 forms a machine learning model based on the training data and the task. At block 1004, the monitoring/assessment system 208 tests the performance of the machine learning model. At block 1006, the deployment system 206 deploys the machine learning model to the service application 124. At block 1008, the monitoring/assessment system 208 monitors suitability of the deployed machine learning model at the service application 124. A model is suitable when the pre-specified performance metric (such as log-loss or confusion matrix) is still ensuring satisfactory performance over the task defined in block 906 (e.g., performance exceeds a preset performance threshold). At decision block 1010, if the monitoring/assessment system 208 determines that the machine learning model is not suitable, the machine learning system 204 trains another machine learning model at block 1002. The monitoring/assessment system 208 assesses the performance of the machine learning model at block 1004, and subject to approval, the machine learning model is then deployed and continuously monitored by the monitoring/assessment system 208 at block 1008 to ensure its ongoing suitability.

Figure 11:
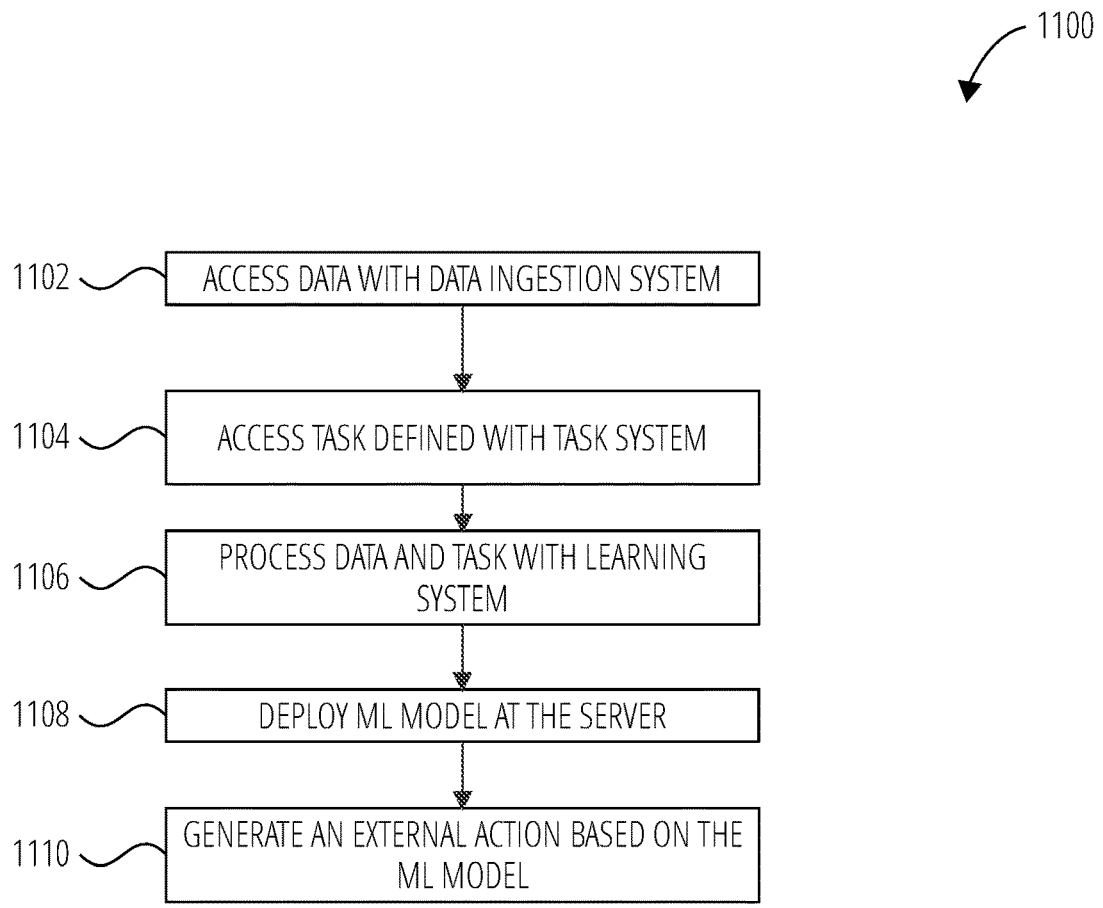
FIG. 11 illustrates a method for generating an external action in accordance with one example embodiment.

FIG. 11 illustrates a method 1100 for generating an external action in accordance with one example embodiment. At block 1102, the dataset ingestion system 202 accesses data. At block 1104, the task system 210 access a task defined by a user of service application 124. At block 1106, the machine learning system 204 forms a machine learning model based on the training data and the task. At block 1108, the machine learning system 204 deploys the machine learning model at the application server 116. At block 1110, the action system 212 generates an external action based on the machine learning model. Examples of external actions: sending an alert to an operator, running a business action or process, marking a transaction as fraud.

Figure 12:
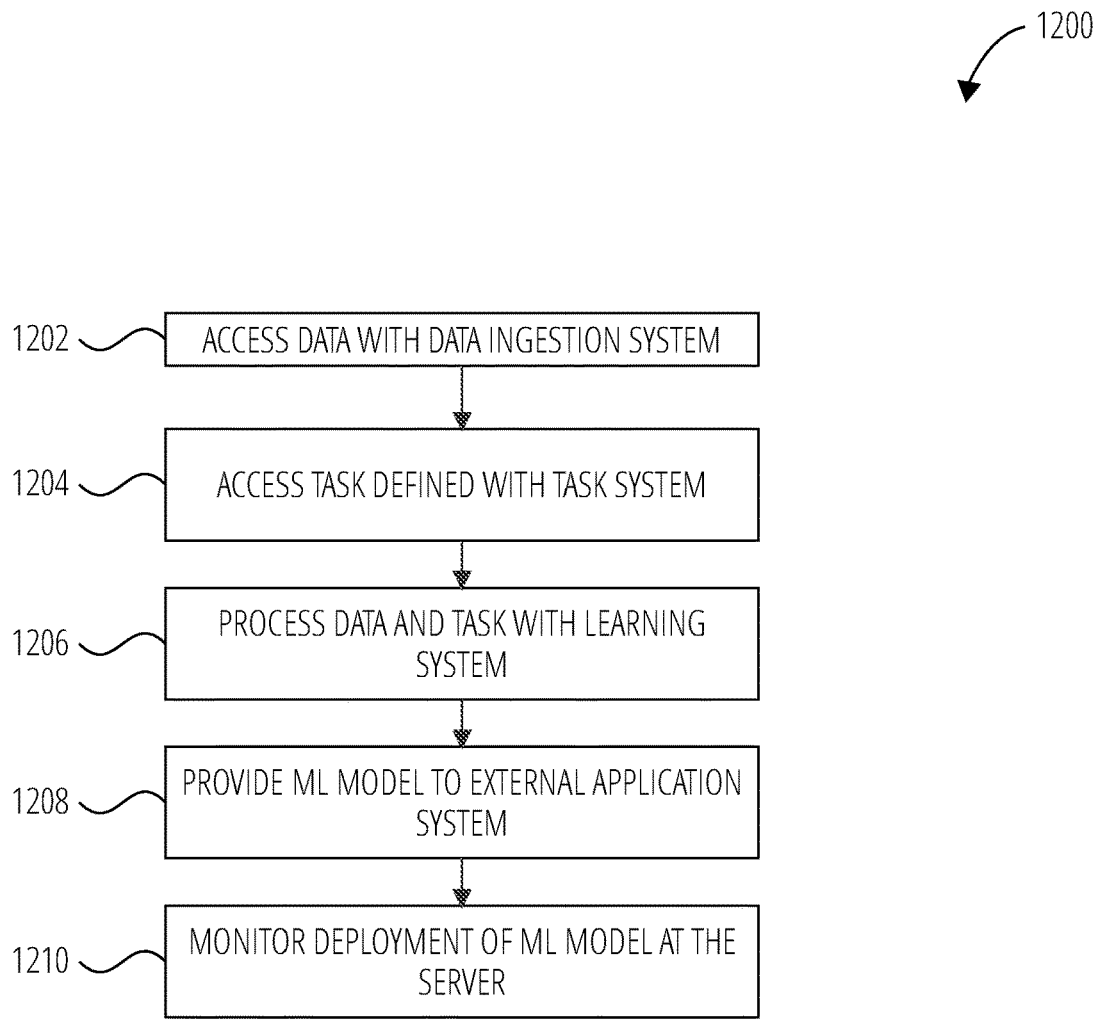
FIG. 12 illustrates a method for monitoring a deployment of a machine learning model in accordance with one example embodiment.

FIG. 12 illustrates a method 1200 for monitoring a deployment of a machine learning model in accordance with one example embodiment. At block 1202, the dataset ingestion system 202 accesses data. At block 1204, the task system 210 accesses a task defined by a user of service application 124. At block 1206, the machine learning system 204 forms a machine learning model based on the training data and the task. At block 1208, the machine learning system 204 provides the machine learning model to an application external to the machine learning platform 122. At block 1210, the monitoring/assessment system 208 monitors a deployment of the machine learning model at the application server 116.

Figure 13:
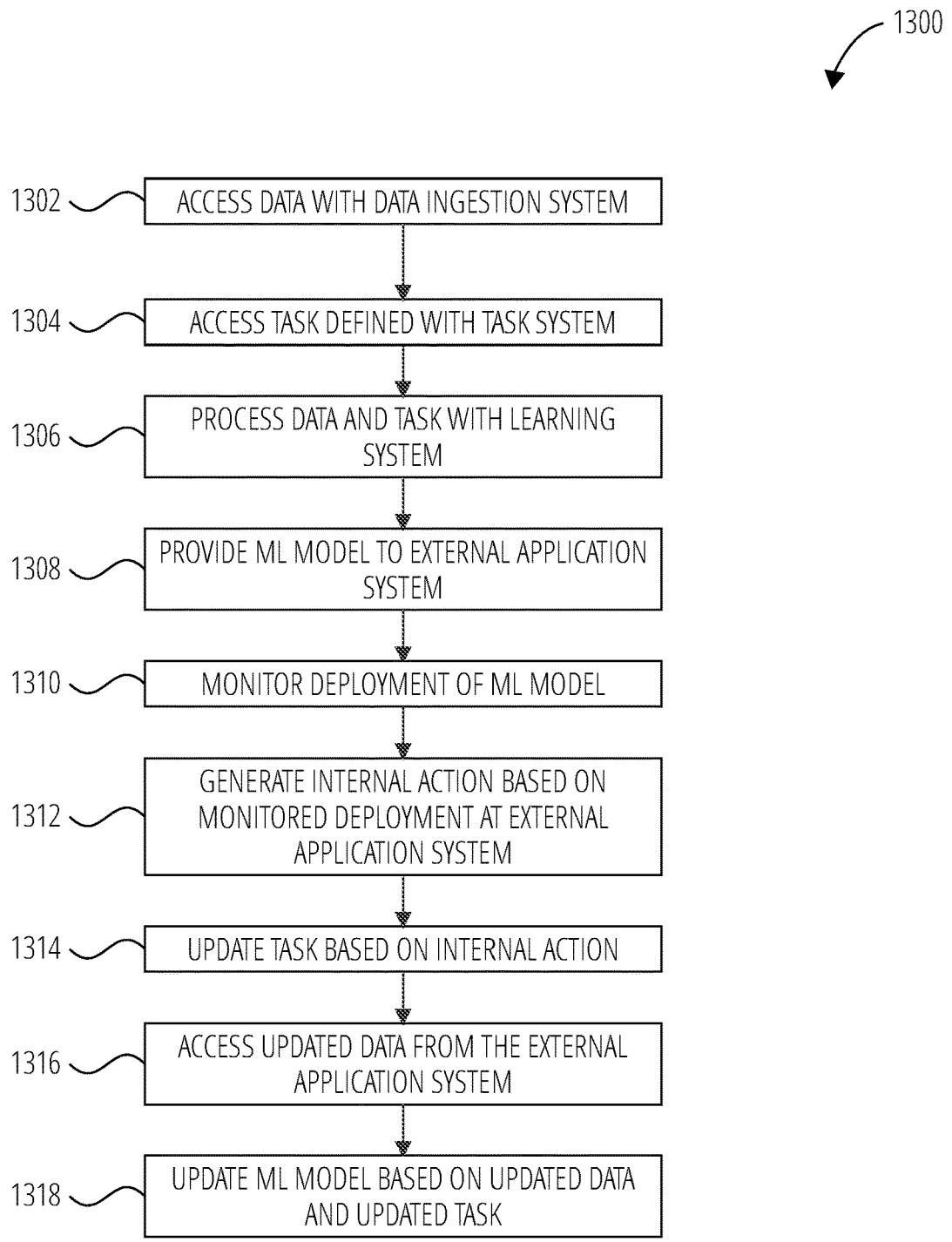
FIG. 13 illustrates a method for updating a machine learning model in accordance with one example embodiment.

FIG. 13 illustrates a method 1300 for updating a machine learning model in accordance with one example embodiment. At block 1302, the dataset ingestion system 202 accesses data. At block 1304, the task system 210 accesses a task defined by a user of service application 124. At block 1306, the machine learning system 204 forms a machine learning model based on the training data and the task. At block 1308, the machine learning system 204 provides the machine learning model to an application external to the machine learning platform 122. At block 1310, the monitoring/assessment system 208 monitors a deployment of the machine learning model. Parameters being monitored include, but are not limited to runtime on new input data, distribution of generated outputs, uncertainty of generated outputs, memory usage, response time, and throughput. At block 1312, the action system 212 generates an internal action based on the monitored deployment at the external application system (e.g., service application 124). Examples of external actions include sending an alert to an operator, running a business action or process, and marking a transaction as a fraud. At block 1314, the task system 210 updates the task based on the internal action. At block 1316, the dataset ingestion system 202 accesses updated data from the external application system. At block 1318, the machine learning system 204 updates the machine learning model based on the updated data and the updated task.

Figure 14:
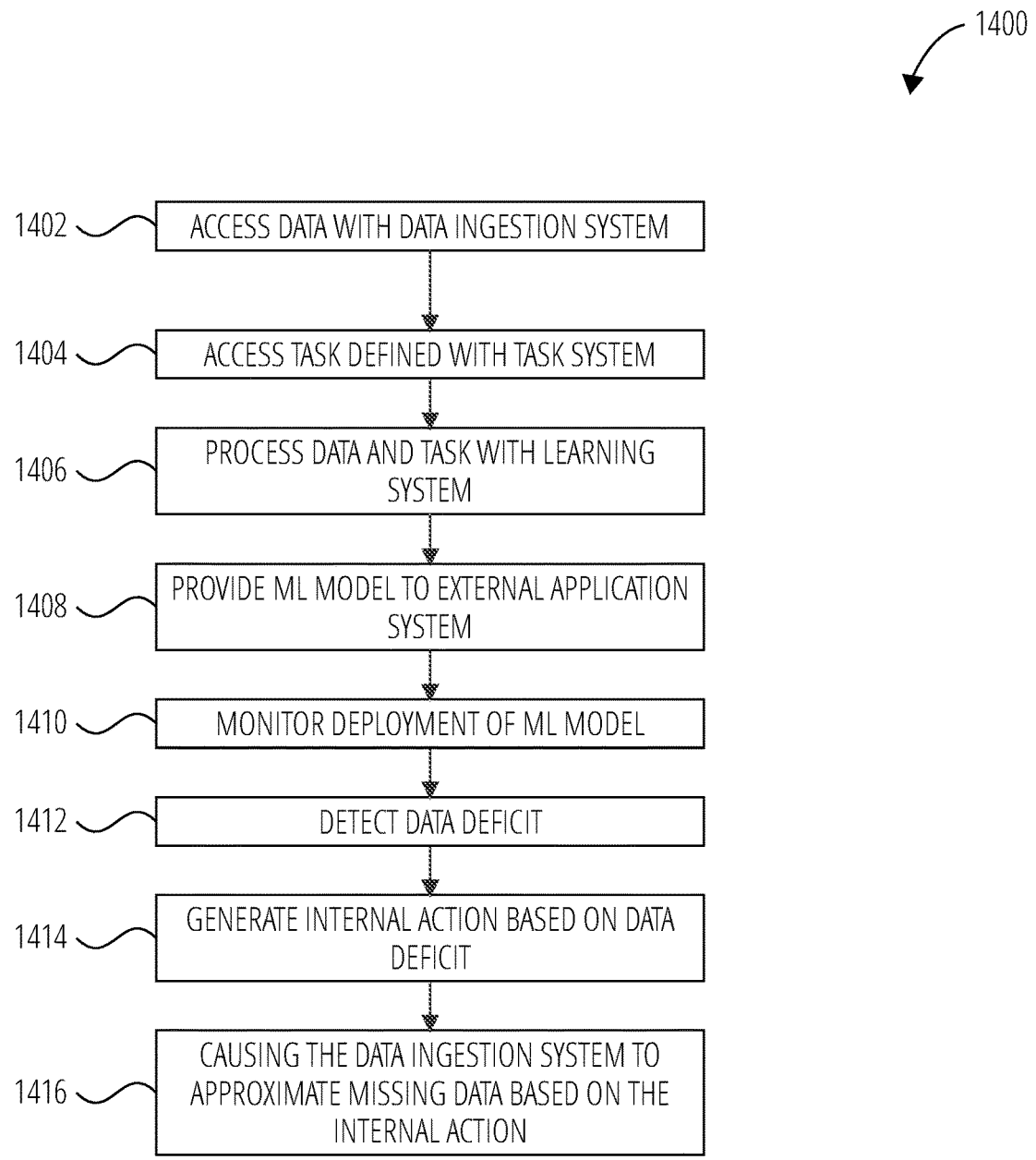
FIG. 14 illustrates a method for detecting data deficit in accordance with one example embodiment.

FIG. 14 illustrates a method 1400 for detecting data deficit in accordance with one example embodiment. At block 1402, the dataset ingestion system 202 accesses data. At block 1404, the task system 210 accesses a task defined by a user of service application 124. At block 1406, the machine learning system 204 forms a machine learning model based on the training data and the task. At block 1408, the machine learning system 204 provides the machine learning model to an application external to the machine learning platform 122. At block 1410, the monitoring/assessment system 208 monitors a deployment of the machine learning model. At block 1412, the monitoring/assessment system 208 detects a data deficit based on a performance of the machine learning model. A data deficit may be in the form of missing data, or incorrect data (maybe caused by a malfunctioning or stuck sensor for example). Feature importance of predictions made from this data may be queried and compared to typical values to discover this. Performance metrics may also be compared to typical/expected performances, as may properties of the input data, such as mean/standard deviation, quantiles over a period etc. At block 1414, the action system 212 generates an internal action based on the data deficit. At block 1416, the dataset ingestion system 202 accesses the missing data based on the internal action. Given missing data, it may be possible to find examples of similar data points which have been witnessed in the past. The missing data might then be approximated with values from these similar data points. Alternatively, a library of datasets may be queried to find replacement data.

Figure 15:
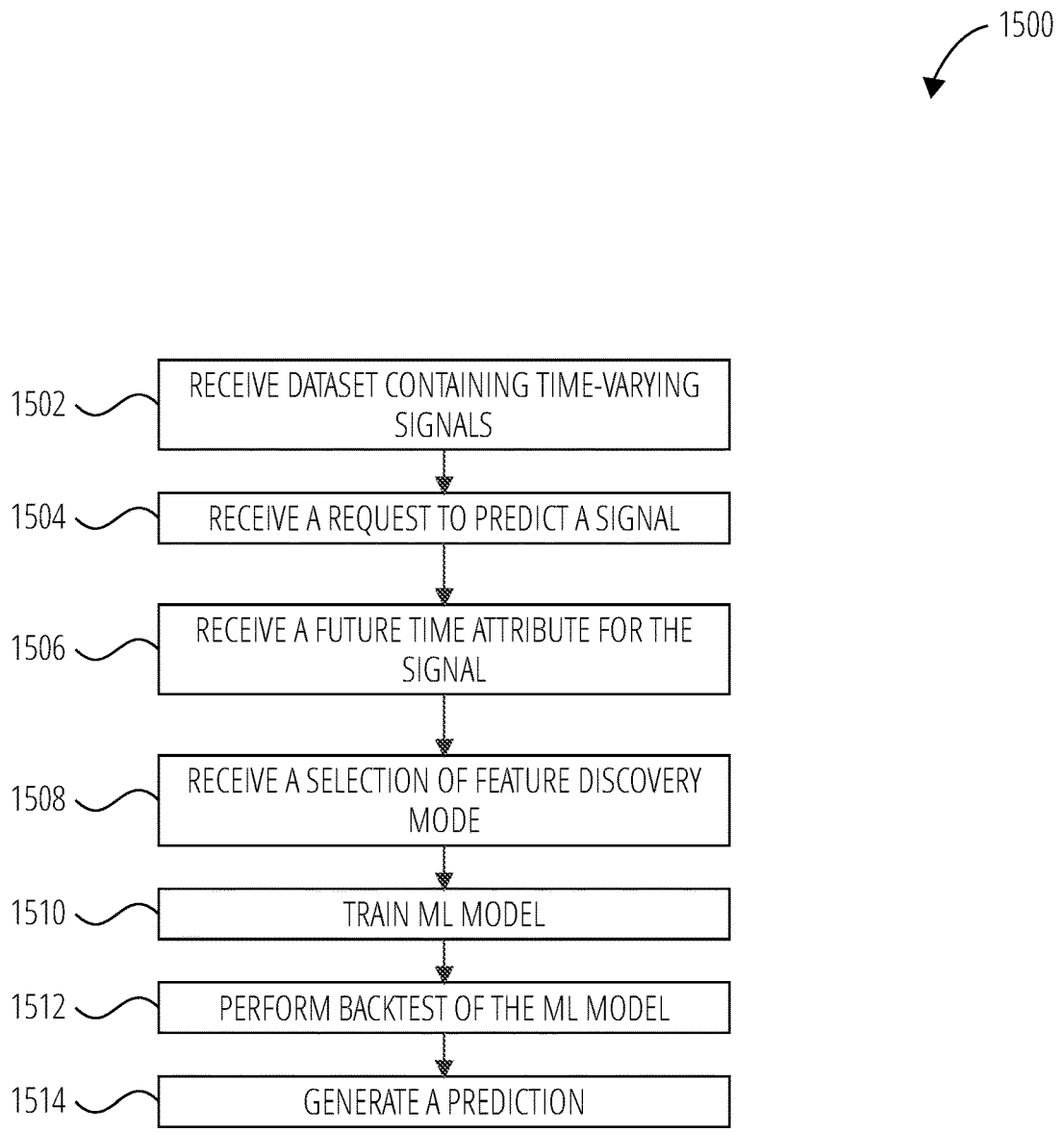
FIG. 15 illustrates a method for forming a machine learning model based on time-series signals in accordance with one example embodiment.

FIG. 15 illustrates a method for forming a machine learning model based on time-series signals in accordance with one example embodiment. The method 1500 may be performed by one or more computational devices, as described below.

At block 1502, the dataset ingestion system 502 receives dataset containing time-varying signals. At block 1504, the target specification system 512 receives a request to predict a signal from the time-varying signals. At block 1506, the target specification system 512 receives a future time attribute for the signal. At block 1508, the target specific feature discovery system 506 receives a selection of feature discovery mode. At block 1510, the model training system 504 trains a machine learning model based on the discovered features. At block 1512, the back-testing system 510 performs a back test of the machine learning model. At block 1514, the prediction system 508 generates a prediction of a value of the signal at the future time attribute.

Figure 16:
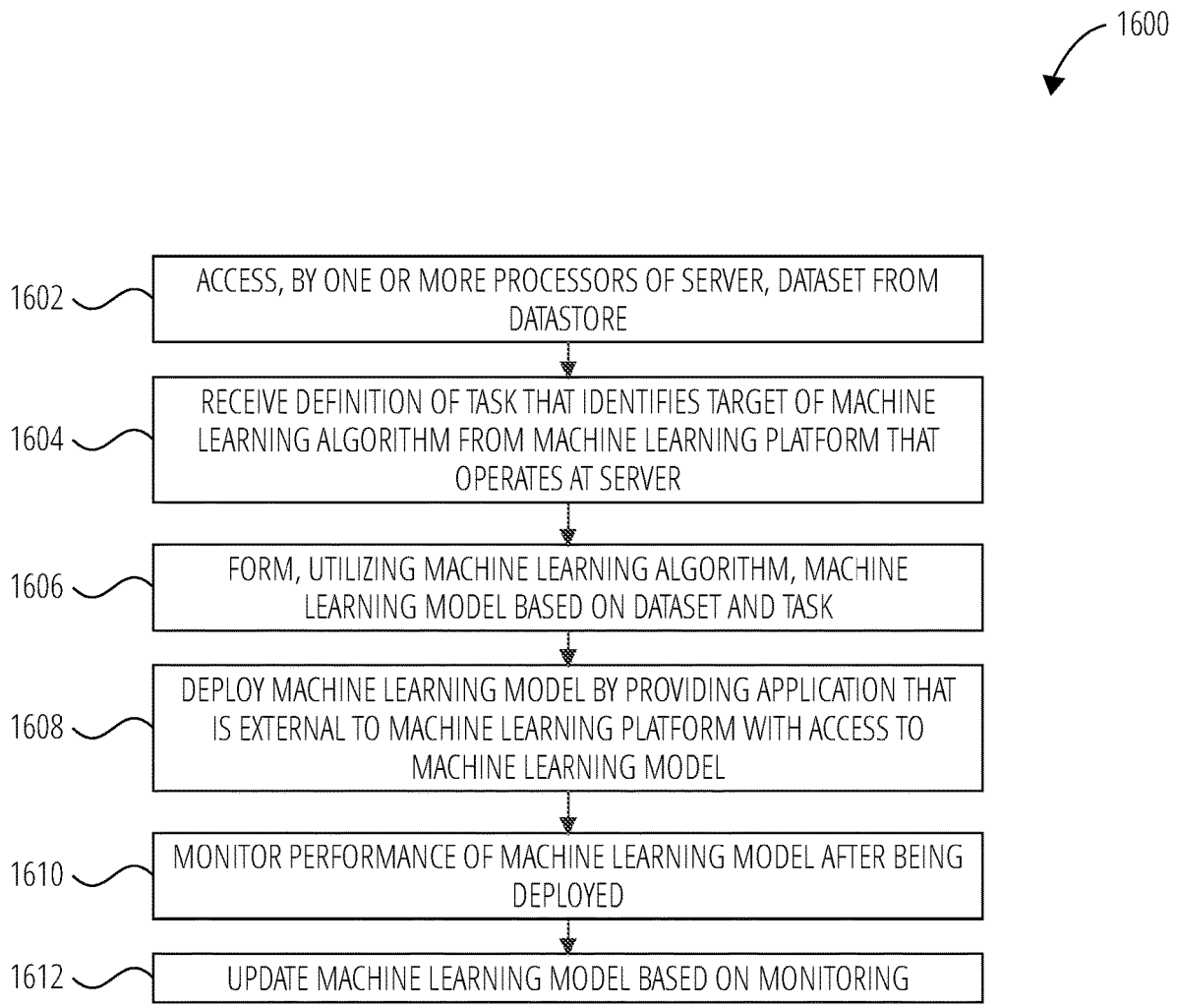
FIG. 16 illustrates a routine 1600 in accordance with one embodiment.

FIG. 16 illustrates a routine 1600 in accordance with one embodiment. In block 1602, routine 1600 accesses, by one or more processors of a server, a dataset from a datastore. In block 1604, routine 1600 receives a definition of a task that identifies a target of a machine learning algorithm from a machine learning platform that operates at the server. In block 1606, routine 1600 forms, utilizing the machine learning algorithm, a machine learning model based on the dataset and the task. In block 1608, routine 1600 deploys the machine learning model by providing an application that is external to the machine learning platform with access to the machine learning model. In block 1610, routine 1600 monitors a performance of the machine learning model after being deployed. In block 1612, routine 1600 updates the machine learning model based on the monitoring.

Figure 17:
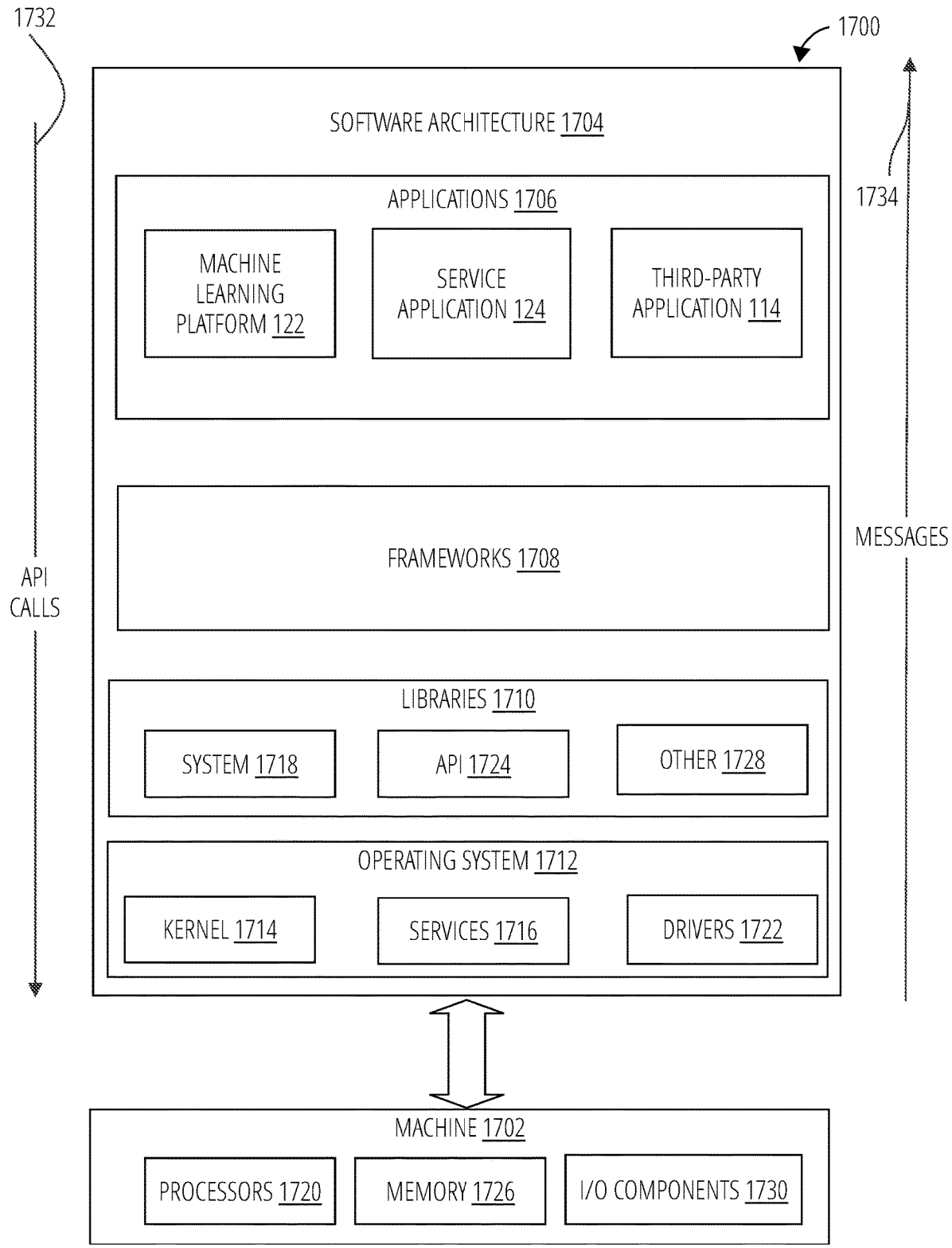
FIG. 17 is block diagram showing a software architecture within which the present disclosure may be implemented, according to an example embodiment.

FIG. 17 is a block diagram 1700 illustrating a software architecture 1704, which can be installed on any one or more of the devices described herein. The software architecture 1704 is supported by hardware such as a machine 1702 that includes processors 1720, memory 1726, and I/O components 1730. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1732 through the software stack and receive messages 1734 in response to the API calls 1732.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, processor management (e.g., scheduling), component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1710 provide a low-level common infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1710 can also include a wide variety of other libraries 1728 to provide many other APIs to the applications 1706.

The frameworks 1708 provide a high-level common infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example embodiment, the applications 1706 may include a machine learning platform 122, A service application 124, and a broad assortment of other applications such as a third-party application 114. The applications 1706 are programs that execute functions defined in the programs. Various programming languages can be employed to create one or more of the applications 1706, structured in a variety of manners, such as object-oriented programming languages (e.g., Objective-C, Java, or C++) or procedural programming languages (e.g., C or assembly language). In a specific example, the third-party application 114 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 114 can invoke the API calls 1732 provided by the operating system 1712 to facilitate functionality described herein.

Figure 18:
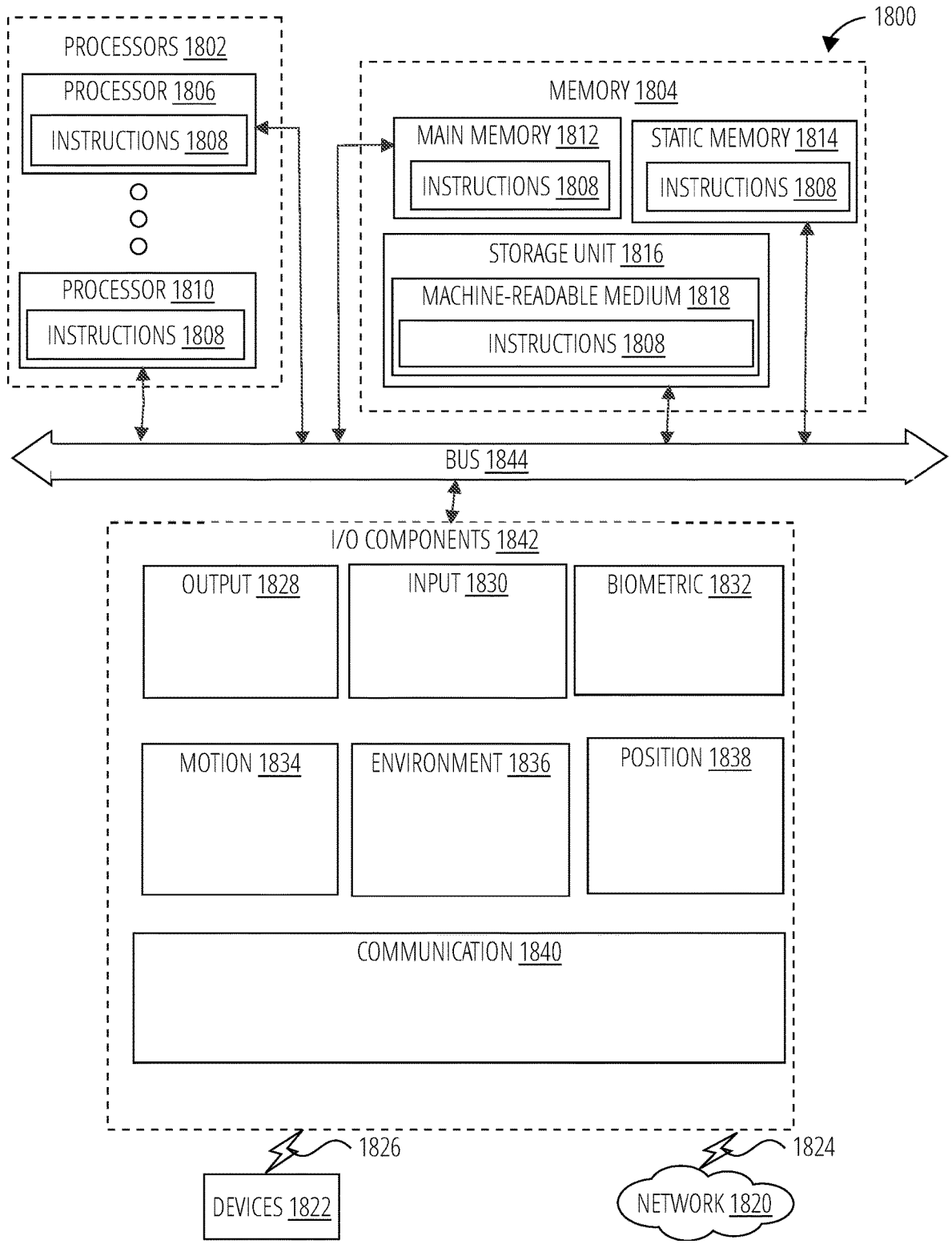
FIG. 18 is a diagrammatic representation of a machine in the form of a computer system within which a set of instructions may be executed for causing the machine to perform any one or more of the methodologies discussed herein, according to an example embodiment.

FIG. 18 is a diagrammatic representation of the machine 1800 within which instructions 1808 (e.g., software, a program, an application, an applet, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein.

The machine 1800 may include processors 1802, memory 1804, and I/O components 1842, which may be configured to communicate with each other via a bus 1844. In an example embodiment, the processors 1802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1806 and a processor 1810 that execute the instructions 1808. The term "processor" is intended to include multi-core processors that may comprise two or more independent processors (sometimes referred to as "cores") that may execute instructions contemporaneously. Although FIG. 18 shows multiple processors 1802, the machine 1800 may include a single processor with a single core, a single processor with multiple cores (e.g., a multi-core processor), multiple processors with a single core, multiple processors with multiples cores, or any combination thereof.

The memory 1804 includes a main memory 1812, a static memory 1814, and a storage unit 1816, both accessible to the processors 1802 via the bus 1844. The main memory 1804, the static memory 1814, and storage unit 1816 store the instructions 1808 embodying any one or more of the methodologies or functions described herein. The instructions 1808 may also reside, completely or partially, within the main memory 1812, within the static memory 1814, within machine-readable medium 1818 within the storage unit 1816, within at least one of the processors 1802 (e.g., within the processor's cache memory), or any suitable combination thereof, during execution thereof by the machine 1800.

The I/O components 1842 may include a wide variety of components to receive input, provide output, produce output, transmit information, exchange information, capture measurements, and so on. The specific I/O components 1842 that are included in a particular machine will depend on the type of machine. For example, portable machines such as mobile phones may include a touch input device or other such input mechanisms, while a headless server machine will likely not include such a touch input device. It will be appreciated that the I/O components 1842 may include many other components that are not shown in FIG. 18. In various example embodiments, the I/O components 1842 may include output components 1828 and input components 1830. The output components 1828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1842 may include biometric components 1832, motion components 1834, environmental components 1836, or position components 1838, among a wide array of other components. For example, the biometric components 1832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1834 include acceleration sensor components (e.g., accelerometer), gravitation sensor components, rotation sensor components (e.g., gyroscope), and so forth. The environmental components 1836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1838 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1842 further include communication components 1840 operable to couple the machine 1800 to a network 1820 or devices 1822 via a coupling 1824 and a coupling 1826, respectively. For example, the communication components 1840 may include a network interface component or another suitable device to interface with the network 1820. In further examples, the communication components 1840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1822 may be another machine or any of a wide variety of peripheral devices (e.g., a peripheral device coupled via a USB).

Moreover, the communication components 1840 may detect identifiers or include components operable to detect identifiers. For example, the communication components 1840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1840, such as location via Internet Protocol (IP) geolocation, location via Wi-Fi® signal triangulation, location via detecting an NFC beacon signal that may indicate a particular location, and so forth.

The various memories (e.g., memory 1804, main memory 1812, static memory 1814, and/or memory of the processors 1802) and/or storage unit 1816 may store one or more sets of instructions and data structures (e.g., software) embodying or used by any one or more of the methodologies or functions described herein. These instructions (e.g., the instructions 1808), when executed by processors 1802, cause various operations to implement the disclosed embodiments.

The instructions 1808 may be transmitted or received over the network 1820, using a transmission medium, via a network interface device (e.g., a network interface component included in the communication components 1840) and using any one of a number of well-known transfer protocols (e.g., hypertext transfer protocol (HTTP)). Similarly, the instructions 1808 may be transmitted or received using a transmission medium via the coupling 1826 (e.g., a peer-to-peer coupling) to the devices 1822.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Examples

Example 1 is a computer-implemented method comprising: accessing, by one or more processors of a server, a dataset from a datastore; receiving a definition of a task that identifies a target of a machine learning algorithm from a machine learning platform that operates at the server; forming, utilizing the machine learning algorithm, a machine learning model based on the dataset and the task; deploying the machine learning model by providing an application that is external to the machine learning platform with access to the machine learning model; monitoring a performance of the machine learning model after being deployed; and updating the machine learning model based on the monitoring.

Example 2 includes example 1, wherein accessing the dataset further comprises: accessing a library of dataset from the datastore; identifying, based on the task and the dataset, additional data from a library of dataset; and augmenting the dataset with the additional data.

Example 3 includes any of the above examples, wherein accessing the dataset further comprises: preparing the dataset for processing by partitioning and filtering the dataset based on the task, wherein the machine learning model is based on the prepared dataset.

Example 4 includes any of the above examples, wherein accessing the dataset further comprises: defining a model search space based on the dataset, wherein the machine learning model is formed from the model search space.

Example 5 includes any of the above examples, wherein monitoring further comprises: testing the machine learning model; receiving, from the application, a performance assessment of the machine learning model; generating a performance indicator of the machine learning model based on the testing and the performance assessment; determining that the performance indicator of the machine learning model transgresses the machine learning model performance threshold; and in response to determining that the performance indicator of the machine learning model transgresses the machine learning model performance threshold, updating the machine learning model, wherein updating the machine learning model further comprises: updating the dataset; updating the definition of the task based on the performance indicator of the machine learning model; and forming, utilizing the machine learning algorithm, another machine learning model based on the updated definition of the task and the updated dataset.

Example 6 includes any of the above examples, wherein updating the machine learning model further comprises: detecting data deficit based on the performance of the machine learning model; accessing, from the datastore, additional data that remedy the data deficit; and forming, utilizing the machine learning algorithm, another machine learning model based on the additional data and the task.

Example 7 includes any of the above examples, wherein updating the machine learning model further comprises: updating the definition of the task; accessing, from the datastore, additional data based on the updated definition of the task; and forming, utilizing the machine learning algorithm, another machine learning model based on the additional data and the updated definition of the task, wherein the target indicates at least one of an attribute of the dataset to be solved or an exploration of features of the dataset.

Example 8 includes any of the above examples, further comprising: identifying features of the dataset based on the target, the target indicating a future point in time, the dataset comprising a plurality of time-varying signals; training the machine learning model based on the identified features; and generating, using the trained machine learning model, a prediction of data of an attribute of the dataset at the future point in time.

Example 9 includes any of the above examples, further comprising: receiving a selection of a signal from the plurality of time-varying signals in the dataset, wherein the target indicates the future point in time of the signal;

performing a back test for the selected signal using the trained machine learning model; and validating the trained machine learning model based on results from the back test.

Example 10 includes any of the above examples, further comprising: accessing a feature set of the dataset; forming an augmented feature set from the feature set; measuring dependencies of the augmented feature set for each target of a target set; and generating a single feature for each target of the target set.

Example 11 includes any of the above examples, wherein forming the augmented feature set further comprises: for each signal of the dataset, scanning a corresponding signal for historical points; for each signal of the dataset, shifting the historical points to a present time; for each signal of the dataset, generating a new signal based on the shifted historical points; and forming an augmented feature set based on the new signals from all signals in the feature set.

Example 12 is a computing apparatus comprising: a Processor; and a memory storing instructions that, when executed by the Processor, configure the computing apparatus to perform operations comprising: access, by one or more processors of a server, a dataset from a datastore; receive a definition of a task that identifies a target of a machine learning algorithm from a machine learning platform that operates at the server; form, utilizing the machine learning algorithm, a machine learning model based on the dataset and the task; deploy the machine learning model by providing an application that is external to the machine learning platform with access to the machine learning model; monitor a performance of the machine learning model after being deployed; and update the machine learning model based on the monitoring.

Example 13 includes any of the above examples, wherein accessing the dataset further comprises: access a library of dataset from the datastore; identify, based on the task and the dataset, additional data from a library of dataset; and augment the dataset with the additional data.

Example 14 includes any of the above examples, wherein accessing the dataset further comprises: prepare the dataset for processing by partitioning and filtering the dataset based on the task, wherein the machine learning model is based on the prepared dataset.

Example 15 includes any of the above examples, wherein accessing the dataset further comprises: define a model search space based on the prepared dataset, wherein the machine learning model is formed from the model search space.

Example 16 includes any of the above examples, wherein monitoring further comprises: test the machine learning model; receive, from the application, a performance assessment of the machine learning model; and generate a performance indicator of the machine learning model based on the testing and the performance assessment; determine that the performance indicator of the machine learning model transgresses the machine learning model performance threshold; and in response to determining that the performance indicator of the machine learning model transgresses the machine learning model performance threshold, update the machine learning model, wherein updating the machine learning model further comprises: update the dataset; update the definition of the task based on the performance indicator of the machine learning model; and form, utilizing the machine learning algorithm, another machine learning model based on the updated definition of the task and the updated dataset.

Example 17 includes any of the above examples, wherein updating the machine learning model further comprises: detect data deficit based on the performance of the machine learning model; access, from the datastore, additional data that remedy the data deficit; and form, utilizing the machine learning algorithm, another machine learning model based on the additional data and the task.

Example 18 includes any of the above examples, wherein updating the machine learning model further comprises: update the definition of the task; access, from the datastore, additional data based on the updated definition of the task; and form, utilizing the machine learning algorithm, another machine learning model based on the additional data and the updated definition of the task, wherein the target indicates at least one of an attribute of the dataset to be solved or an exploration of features of the dataset.

Example 19 includes any of the above examples, wherein the instructions further configure the computing apparatus to perform operations comprising: identify features of the dataset based on the target, the target indicating a future point in time, the dataset comprising a plurality of time-varying signals; train the machine learning model based on the identified features; and generate, using the trained machine learning model, a prediction of data of an attribute of the dataset at the future point in time.

Example 20 includes any of the above examples, wherein the instructions further configure the computing apparatus to perform operations comprising: receive a selection of a signal from the plurality of time-varying signals in the dataset, wherein the target indicates the future point in time of the signal; perform a back test for the selected signal using the trained machine learning model; and validate the trained machine learning model based on results from the back test.

Example 21 includes any of the above examples, wherein the instructions further configure the computing apparatus to perform operations comprising: access a feature set of the dataset; form an augmented feature set from the feature set; measure dependencies of the augmented feature set for each target of a target set; and generate a single feature for each target of the target set.

Example 22 is a computer-readable storage medium, the computer-readable storage medium including instructions that when executed by a computer, cause the computer to perform operations comprising: access, by one or more processors of a server, a dataset from a datastore; receive a definition of a task that identifies a target of a machine learning algorithm from a machine learning platform that operates at the server; form, utilizing the machine learning algorithm, a machine learning model based on the dataset and the task; deploy the machine learning model by providing an application that is external to the machine learning platform with access to the machine learning model; monitor a performance of the machine learning model after being deployed; and update the machine learning model based on the monitoring.

What is claimed is:

1. A computer-implemented method comprising:
   accessing, by one or more processors of a server, a dataset from a datastore;
   receiving a definition of a task that identifies a target of a machine learning algorithm from a machine learning platform that operates at the server;
   accessing a look up table that maps a type of task with a machine learning tool, the machine learning tool comprising one of a regression tool, a classification tool, and an unsupervised machine learning tool;

identifying, using the look up table, the machine learning tool corresponding to the type of task based on the definition of the task;

forming, utilizing the machine learning algorithm, a machine learning model based on the dataset, the task, and the machine learning tool;

deploying the machine learning model by providing an application that is external to the machine learning platform with access to the machine learning model;

monitoring a performance of the machine learning model after being deployed; and updating the machine learning model based on the monitoring by:

detecting data deficit based on the performance of the machine learning model, wherein detecting the data deficit comprises identifying missing values and a frequency of the missing values by analyzing statistics of the dataset;

identifying a source of the data deficit as a faulty sensor providing the data;

in response to detecting the data deficit, generating an internal action by accessing without user intervention, from the datastore, additional data that remedy the data deficit, the additional data comprising or replacement data from another dataset of a library of dataset with similar properties to the dataset;

adapting the additional data to match statistical properties of the dataset; and updating the machine learning model based on the adapted additional data and the task.

2. The computer-implemented method of claim 1, wherein accessing the dataset further comprises:

accessing the library of dataset from the datastore;

identifying, based on the task and the dataset, additional data from the library of dataset; and augmenting the dataset with the additional data.

3. The computer-implemented method of claim 1, wherein accessing the dataset further comprises:

preparing the dataset for processing by partitioning and filtering the dataset based on the task, wherein the machine learning model is based on the prepared dataset.

4. The computer-implemented method of claim 1, wherein accessing the dataset further comprises:

defining a model search space based on the dataset, wherein the machine learning model is formed from the model search space.

5. The computer-implemented method of claim 1, wherein monitoring further comprises:

testing the machine learning model;

receiving, from the application, a performance assessment of the machine learning model; and generating a performance indicator of the machine learning model based on the testing and the performance assessment;

determining that the performance indicator of the machine learning model transgresses a machine learning model performance threshold;

in response to determining that the performance indicator of the machine learning model transgresses the machine learning model performance threshold, updating the machine learning model, wherein updating the machine learning model further comprises:

updating the dataset;

updating the definition of the task based on the performance indicator of the machine learning model; and forming, utilizing the machine learning algorithm, another machine learning model based on the updated definition of the task and the updated dataset.

6. The computer-implemented method of claim 1, wherein the machine learning platform comprises a target specific feature discovery system coupled to a data ingestion system and a target specification system, the target specific feature discovery system comprising a spectral signal embedding system, a user-specified signal generation system, a feature reduction system, a feature set optimization system, the spectral signal embedding system comprising a plurality of signal scanning systems and information embedding systems, each signal scanning system and information embedding system corresponding to a feature of the dataset.

7. The computer-implemented method of claim 1, wherein updating the machine learning model further comprises:

updating the definition of the task;

accessing, from the datastore, additional data based on the updated definition of the task; and forming, utilizing the machine learning algorithm, another machine learning model based on the additional data and the updated definition of the task, wherein the target indicates at least one of an attribute of the dataset to be solved or an exploration of features of the dataset.

8. The computer-implemented method of claim 1, further comprising:

identifying features of the dataset based on the target, the target indicating a future point in time, the dataset comprising a plurality of time-varying signals;

training the machine learning model based on the identified features; and generating, using the trained machine learning model, a prediction of data of an attribute of the dataset at the future point in time.

9. The computer-implemented method of claim 8, further comprising:

receiving a selection of a signal from the plurality of time-varying signals in the dataset, wherein the target indicates the future point in time of the signal;

performing a back test for the selected signal using the trained machine learning model; and validating the trained machine learning model based on results from the back test.

10. The computer-implemented method of claim 8, further comprising:

accessing a feature set of the dataset;

forming an augmented feature set from the feature set;

measuring dependencies of the augmented feature set for each target of a target set; and generating a single feature for each target of the target set, wherein forming the augmented feature set further comprises:

for each signal of the dataset, scanning a corresponding signal for historical points;

for each signal of the dataset, shifting the historical points to a present time;

for each signal of the dataset, generating a new signal based on the shifted historical points; and forming an augmented feature set based on the new signals from all signals in the feature set.

11. The computer-implemented method of claim 1, wherein detecting the data deficit comprises identifying invalid data types and outlier values, wherein the additional data further comprise approximated values corresponding to the outliers values, corrected data types corresponding to the invalid data types, and the approximated values comprise similar data points from the other dataset.

12. A computing apparatus, the computing apparatus comprising:
a processor; and
a memory storing instructions that, when executed by the processor, configure the computing apparatus to perform operations comprising:
accessing, by one or more processors of a server, a dataset from a datastore;
receiving a definition of a task that identifies a target of a machine learning algorithm from a machine learning platform that operates at the server;
accessing a look up table that maps a type of task with a machine learning tool, the machine learning tool comprising one of a regression tool, a classification tool, and an unsupervised machine learning tool;
identifying, using the look up table, the machine learning tool corresponding to the type of task based on the definition of the task;
forming, utilizing the machine learning algorithm, a machine learning model based on the dataset, the task, and the machine learning tool;
deploying the machine learning model by providing an application that is external to the machine learning platform with access to the machine learning model;
monitoring a performance of the machine learning model after being deployed; and
updating the machine learning model based on the monitoring by:
detecting data deficit based on the performance of the machine learning model, wherein detecting the data deficit comprises identifying missing values and a frequency of the missing values by analyzing statistics of the dataset;
identifying a source of the data deficit as a faulty sensor providing the data;
in response to detecting the data deficit, generating an internal action by accessing without user intervention, from the datastore, additional data that remedy the data deficit, the additional data comprising replacement data from another dataset of a library of dataset with similar properties to the dataset;
adapting the additional data to match statistical properties of the dataset; and
updating the machine learning model based on the adapted additional data and the task.

13. The computing apparatus of claim 12, wherein accessing the dataset further comprises:
access the library of dataset from the datastore;
identify, based on the task and the dataset, additional data from the library of dataset; and
augment the dataset with the additional data.

14. The computing apparatus of claim 12, wherein accessing the dataset further comprises:
prepare the dataset for processing by partitioning and filtering the dataset based on the task, wherein the machine learning model is based on the prepared dataset.

15. The computing apparatus of claim 12, wherein accessing the dataset further comprises:
define a model search space based on the prepared dataset, wherein the machine learning model is formed from the model search space.

16. The computing apparatus of claim 12, wherein monitoring further comprises:
test the machine learning model;
receive, from the application, a performance assessment of the machine learning model; and
generate a performance indicator of the machine learning model based on the testing and the performance assessment;
determine that the performance indicator of the machine learning model transgresses a machine learning model performance threshold; and
in response to determining that the performance indicator of the machine learning model transgresses the machine learning model performance threshold, update the machine learning model,
wherein updating the machine learning model further comprises:
update the dataset;
update the definition of the task based on the performance indicator of the machine learning model; and
form, utilizing the machine learning algorithm, another machine learning model based on the updated definition of the task and the updated dataset.

17. The computing apparatus of claim 12,
the machine learning platform comprises a target specific feature discovery system coupled to a data ingestion system and a target specification system, the target specific feature discovery system comprising a spectral signal embedding system, a user-specified signal generation system, a feature reduction system, a feature set optimization system, the spectral signal embedding system comprising a plurality of signal scanning systems and information embedding systems, each signal scanning system and information embedding system corresponding to a feature of the dataset.

18. The computing apparatus of claim 12, wherein updating the machine learning model further comprises:
update the definition of the task;
access, from the datastore, additional data based on the updated definition of the task; and
form, utilizing the machine learning algorithm, another machine learning model based on the additional data and the updated definition of the task,
wherein the target indicates at least one of an attribute of the dataset to be solved or an exploration of features of the dataset.

19. The computing apparatus of claim 12, wherein the instructions further configure the computing apparatus to perform operations comprising:
identify features of the dataset based on the target, the target indicating a future point in time, the dataset comprising a plurality of time-varying signals;
train the machine learning model based on the identified features; and
generate, using the trained machine learning model, a prediction of data of an attribute of the dataset at the future point in time.

20. The computing apparatus of claim 19, wherein the instructions further configure the computing apparatus to perform operations comprising:
receive a selection of a signal from the plurality of time-varying signals in the dataset, wherein the target indicates the future point in time of the signal;
perform a back test for the selected signal using the trained machine learning model; and
validate the trained machine learning model based on results from the back test.

21. The computing apparatus of claim 19, wherein the instructions further configure the computing apparatus to perform operations comprising:

access a feature set of the dataset;
form an augmented feature set from the feature set;
measure dependencies of the augmented feature set for each target of a target set; and
generate a single feature for each target of the target set.

22. A non-transitory computer-readable storage medium, the non-transitory computer-readable storage medium including instructions that when executed by a computer, cause the computer to perform operations comprising: access, by one or more processors of a server, a dataset from a datastore; receive a definition of a task that identifies a target of a machine learning algorithm from a machine learning platform that operates at the server; access a look up table that maps a type of task with a machine learning tool, the machine learning tool comprising one of a regression tool, a classification tool, and an unsupervised machine learning tool; identify, using the look up table, the machine learning tool corresponding to the type of task based on the definition of the task; form, utilizing the machine learning algorithm, a machine learning model based on the dataset, the task, and the machine learning tool; deploy the machine learning model by providing an application that is external to the machine learning platform with access to the machine learning model; monitor a performance of the machine learning model after being deployed; and update the machine learning model based on the monitoring by: detecting data deficit based on the performance of the machine learning model, wherein detecting the data deficit comprises identifying missing values and a frequency of the missing values by analyzing statistics of the dataset; identifying a source of the data deficit as a faulty sensor providing the data; in response to detecting the data deficit, generating an internal action by accessing without user intervention, from the datastore, additional data that remedy the data deficit, the additional data comprising replacement data from another dataset of a library of dataset with similar properties to the dataset; adapting the additional data to match statistical properties of the dataset; and updating the machine learning model based on the adapted additional data and the task.

* * * * *

UNITED STATES PATENT AND TRADEMARK OFFICE
CERTIFICATE OF CORRECTION

PATENT NO. : 12,067,463 B2
APPLICATION NO. : 16/793814
DATED : August 20, 2024
INVENTOR(S) : Roberts et al.

It is certified that error appears in the above-identified patent and that said Letters Patent is hereby corrected as shown below:

On the Title Page

In item (71), in "Applicant", in Column 1, Line 1, delete "Ltd," and insert --Ltd.,-- therefor In item (73), in "Assignee", in Column 1, Line 1, delete "Ltd," and insert --Ltd.,-- therefor In the Claims In Column 21, Line 24, in Claim 1, after "comprising", delete "or"

Signed and Sealed this
Fifteenth Day of October, 2024

*Katherine Kelly Vidal*
Katherine Kelly Vidal
*Director of the United States Patent and Trademark Office*